United States Patent
Wade et al.

(10) Patent No.: US 10,476,607 B2
(45) Date of Patent: Nov. 12, 2019

(54) WIRELESS SIGNAL NOISE REDUCTION

(71) Applicant: Square, Inc., San Francisco, CA (US)

(72) Inventors: Jeremy Wade, San Francisco, CA (US); Afshin Rezayee, Richmond Hill (CA)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/721,855

(22) Filed: Sep. 30, 2017

(65) Prior Publication Data

US 2019/0103925 A1     Apr. 4, 2019

(51) Int. Cl.
| | | |
|---|---|---|
| *H04B 15/00* | (2006.01) | |
| *H04B 5/00* | (2006.01) | |
| *G06Q 20/20* | (2012.01) | |
| *H04W 4/80* | (2018.01) | |
| *H04W 88/02* | (2009.01) | |

(52) U.S. Cl.
CPC ........... *H04B 15/00* (2013.01); *G06Q 20/202* (2013.01); *H04B 5/0031* (2013.01); *H04W 4/80* (2018.02); *H04W 88/02* (2013.01)

(58) Field of Classification Search
CPC ...................................................... H04B 15/00
See application file for complete search history.

(56) References Cited

U.S. PATENT DOCUMENTS

| | | |
|---|---|---|
| 5,838,578 A | 11/1998 | Pippin |
| 6,025,744 A | 2/2000 | Bertolet et al. |
| 6,172,555 B1 | 1/2001 | Gusinov |
| 6,921,199 B2 | 7/2005 | Aota et al. |
| 6,989,692 B1 | 1/2006 | Wong |
| 7,839,181 B1 | 11/2010 | Alfke |
| 8,571,502 B2 | 10/2013 | Frank |
| 9,276,432 B2 | 3/2016 | Kang et al. |
| 9,692,417 B1 | 6/2017 | Rezayee et al. |

(Continued)

FOREIGN PATENT DOCUMENTS

| | | |
|---|---|---|
| DE | 43 18 378 A1 | 12/1994 |
| DE | 43 19 977 A1 | 12/1994 |

(Continued)

OTHER PUBLICATIONS

Notice of Allowance dated Feb. 27, 2017, for U.S. Appl. No. 15/253,779, of Rezayee, A., et al., filed Aug. 31, 2016.

(Continued)

*Primary Examiner* — Hsinchun Liao
(74) *Attorney, Agent, or Firm* — Maynard Cooper & Gale, LLP; Chitra M. Kalyanaraman, Esq.

(57) ABSTRACT

A payment terminal has a clock management unit for providing clock signals to components of the payment terminal. The payment terminal also has a wireless communication interface for communicating wireless signals. A processing unit of the payment terminal may monitor operation of a wireless communication interface of the payment terminal and, when the payment terminal is communicating wirelessly, modify an initial clock signal provided to one or more components of the payment terminal that emit RF noise to modify a frequency at which the RF noise occurs. When the payment terminal is no longer transmitting, the processing unit may provide the initial clock signal to the RF noise source.

30 Claims, 8 Drawing Sheets

(56) References Cited

U.S. PATENT DOCUMENTS

| | | |
|---|---|---|
| 9,732,758 B2 | 8/2017 | Hsiao |
| 9,917,577 B1 | 3/2018 | Rezayee et al. |
| 9,941,884 B2 | 4/2018 | Rezayee et al. |
| 9,959,536 B1 | 5/2018 | Shivnaraine et al. |
| 10,175,118 B1 | 1/2019 | Rezayee et al. |
| 10,255,590 B1 | 4/2019 | Wade et al. |
| 2003/0014682 A1* | 1/2003 | Schmidt ............ G06F 1/08 713/500 |
| 2003/0118079 A1 | 6/2003 | Marinet et al. |
| 2004/0036514 A1 | 2/2004 | Kwon |
| 2004/0062293 A1 | 4/2004 | Breinlinger |
| 2006/0082391 A1 | 4/2006 | Hsu et al. |
| 2009/0227219 A1* | 9/2009 | Sheikh-Movahhed ............ H04B 15/005 455/160.1 |
| 2010/0046580 A1 | 2/2010 | Hasegawa |
| 2010/0054302 A1 | 3/2010 | Anzai |
| 2011/0267018 A1 | 11/2011 | Tao |
| 2013/0015907 A1 | 1/2013 | Li et al. |
| 2013/0235906 A1 | 9/2013 | Kim et al. |
| 2014/0057681 A1* | 2/2014 | Grivas ............ G06F 3/044 455/566 |
| 2015/0325274 A1 | 11/2015 | Shim et al. |
| 2015/0349778 A1 | 12/2015 | Behrends et al. |
| 2016/0005345 A1 | 1/2016 | Kubo |
| 2016/0241280 A1 | 8/2016 | Van der Goes |
| 2016/0282193 A1 | 9/2016 | Tanaka et al. |
| 2018/0088615 A1 | 3/2018 | Mori et al. |
| 2018/0209854 A1 | 7/2018 | Feldman et al. |

FOREIGN PATENT DOCUMENTS

| | | |
|---|---|---|
| DE | 198 55 195 A1 | 6/2000 |
| JP | 53-59352 A | 5/1978 |
| WO | 2018/044725 A1 | 3/2018 |
| WO | 2019/068041 A1 | 4/2019 |

OTHER PUBLICATIONS

Non-Final Office Action dated Jun. 29, 2017, for U.S. Appl. No. 15/253,731, of Rezayee, A., et al., filed Aug. 31, 2016.
Non-Final Office Action dated Jul. 20, 2017, for U.S. Appl. No. 15/253,769, of Rezayee, A., et al., filed Aug. 31, 2016.
Notice of Allowance dated Oct. 27, 2017, for U.S. Appl. No. 15/253,731, of Rezayee, A., et al, filed Aug. 31, 2016.
Notice of Allowance dated Nov. 27, 2017, for U.S. Appl. No. 15/253,769, of Rezayee, A., et al, et al., filed Aug. 31, 2016.
Notice of Allowance dated Dec. 19, 2017, for U.S. Appl. No. 15/283,526, of Shivnaraine, R., et al., filed Oct. 3, 2016.
Non-Final Office Action dated Jun. 15, 2018, for U.S. Appl. No. 15/721,864, of Wade, J., et al., filed Sep. 30, 2017.
Notice of Allowance dated Aug. 31, 2018, for U.S. Appl. No. 15/253,806, of Rezayee, A., et al., filed Aug. 31, 2016.
Notice of Allowance dated Nov. 21, 2018, for U.S. Appl. No. 15/721,864, of Wade, J., et al., filed Sep. 30, 2017.
International Search Report and Written Opinion for International Application No. PCT/US2017/048667, dated Dec. 7, 2017.
International Search Report and Written Opinion for International Application No. PCT/US2018/053635, dated Dec. 20, 2018.

* cited by examiner

US 10,476,607 B2

WIRELESS SIGNAL NOISE REDUCTION

BACKGROUND

Radio frequency ("RF") communication devices are capable of communicating wireless signals with other RF communication devices, and may be used in various transactions, such as payment transactions. An RF communication device may have an antenna and related circuitry for receiving and transmitting wireless signals from another RF communication device. The RF communication devices may communicate wireless messages using various RF communication protocols, such as near field communication ("NFC") and Bluetooth. A first RF communication device may generate a wireless carrier signal at a suitable frequency, such as 13.56 MHz, 2.4 GHz, etc., and transmit that signal over its antenna. When the antenna of a second RF communication device is within range of the antenna of the first RF communication device, the two devices may communicate wirelessly.

The RF communication devices may communicate data by applying additional energy to the carrier signal to modulate the signal at a suitable frequency, depending upon the communication protocol. The additional energy may modulate an amplitude, frequency, or phase the carrier signal at the suitable frequency. A second RF communication device may interpret modulation of the amplitude, frequency, or phase of the carrier signal at the frequency as data from the first RF communication device, such as binary data bits. In some cases, the RF communication devices may exchange modulated signals across a number of different sub-frequencies within one or more wireless communication frequency bands.

Signals exchanged between the RF communication devices may experience RF noise that interferes with underlying wireless data signal. Too much noise in a RF signal can distort the signal so that a RF communication device cannot detect modulation of the carrier signal, which can lead to errors in interpreting data carried by the wireless signal. The RF noise may interfere if it has sufficient amplitude at frequency or harmonics that at least partially overlaps with the wireless communication frequencies of the RF communication devices.

The RF communication devices may encounter various sources of RF noise during operation. Electromagnetic fields may be present in environments where the RF communication devices are operating, and may affect wireless signals. In addition, RF noise may be emitted during operation of electronic circuitry. For example, components of an RF communication device, such as a processor or switching circuitry may emit RF noise while operating. The RF noise emitted by the components of the RF communication device may have a frequency that overlaps the frequency of signals communicated by the RF communication devices. This RF noise can lead to errors in the processing of signals communicated between the RF communication devices, resulting in increased processing times, poor data transmission quality, or data loss.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
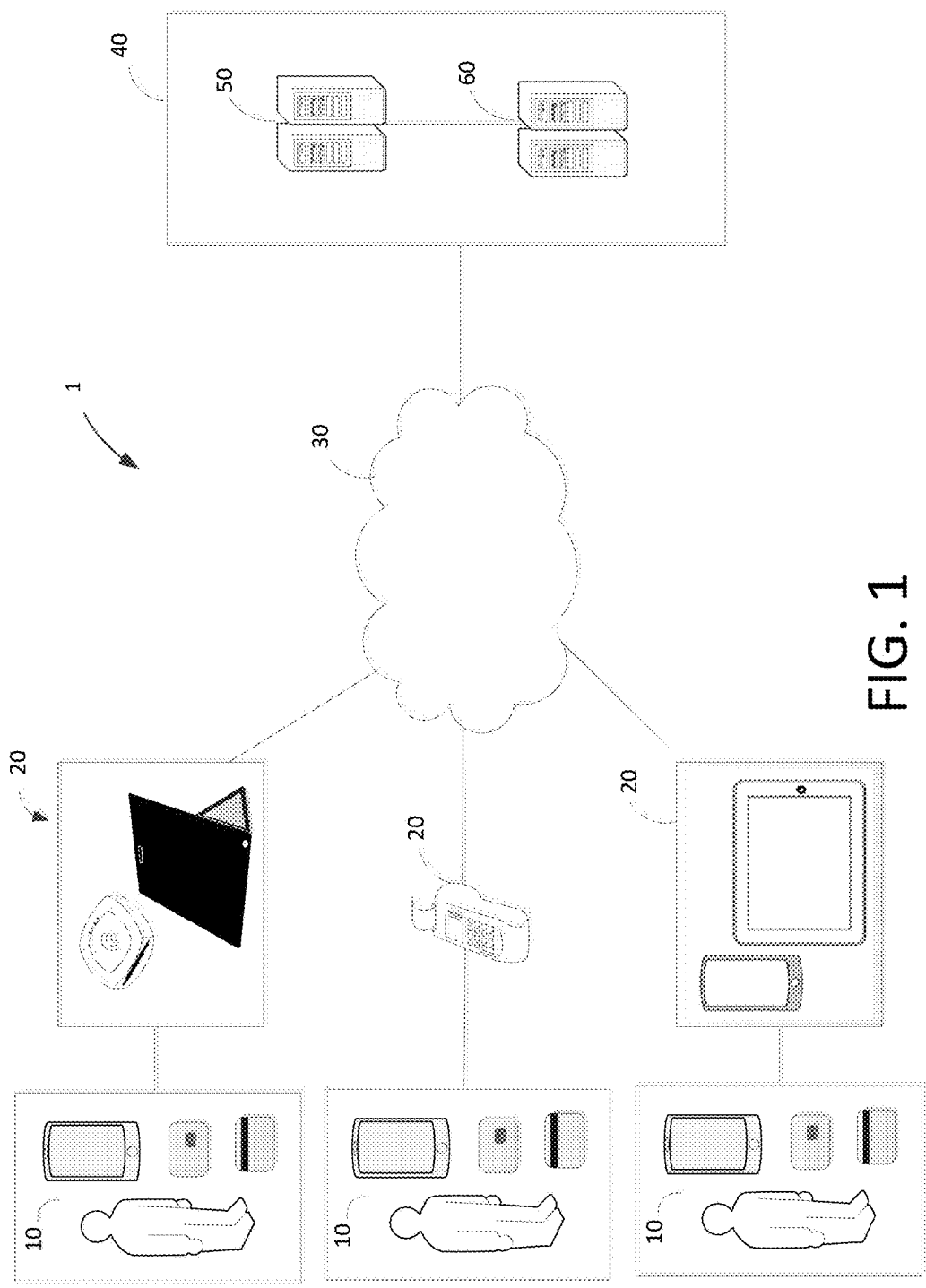
FIG. 1 shows an illustrative block diagram of a payment system in accordance with some embodiments of the present disclosure.

A payment system may have one or more point-of-sale (POS) terminals that facilitate payment transactions. As part of these payment transactions the POS terminal exchanges information with other devices via wireless radio frequency (RF) communication techniques, WiFi, Bluetooth classic, Bluetooth low-energy, or NFC. The merchant terminal may exchange payment information and customer information with a customer terminal. The terminal may receive payment information from a customer's payment device (e.g., from credit card with a magstripe or EMV chip, or a NFC-enabled electronic device) and communicate the payment information to other devices such as additional local terminals and remote servers of payment service systems and financial institutions. In this manner, the POS terminal communicates and exchanges a variety of information via wireless communication as part of processing payment transactions.

RF noise may be present in electronic signals communicated at the POS terminal, and may be emitted by various components of the POS terminal. The RF noise may occur because of the presence of electromagnetic energy that has a frequency at or near a frequency of a channel used by the merchant terminal or customer terminal to communicate a wireless signal. Further, wireless signals may experience noise because of interference from various sources of RF noise in the environment around the POS terminal. All such RF noise can affect wireless RF communication between the POS terminal and other devices.

Although RF noise may generally be present in signals produced and communicated as part of operations of the POS terminal, the RF noise can be managed to reduce the noise and thus increase the signal to noise ratio. For example, effects of RF noise on processing of wireless RF signals can be minimized by processing a received RF signal at times when RF noise levels are low, such as below a threshold noise level. In addition, RF noise emitted by other components of the POS terminal operating at a frequency that overlaps with the RF communication frequency may be reduced by modifying the components' operating frequency to a frequency that is outside the RF frequency until RF communication is completed.

Instructions stored in memory at the POS terminal may provide steps for optimizing noise source behavior for RF communication. One or more processing units of the POS terminal can execute the instructions to control a clock management unit that generates clock signals and provides them to components of the POS terminal. The instructions can be executed to compare characteristics of the signals (e.g., phase, amplitude, frequency, etc.) to identify a noise threshold, and to process communications at times when noise falls below the threshold. The instructions also can be executed to reduce effects of noise on wireless communications by modifying operating frequencies of components that emit RF noise during wireless communications. The instructions may be executed to modify operating frequencies of the RF noise-emitting components by modifying clock signals provided to the components, and to return the operating frequency of the noise-emitting component to its initial operating frequency when wireless communication has been completed. The operation of components that emit RF noise may also be modified in other ways, such as by modifying the operation of the RF emitters during wireless communications. Reduced sets of operations such may be performed to avoid operations that result in large levels of RF noise emissions.

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application. The payment terminal 20 may include more than one payment terminal device, such as when the payment terminal comprises a merchant terminal and a customer terminal for processing payment information.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a dedicated customer terminal, smart phone, or watch operating as a NFC payment device, information about the approved transaction and additional information (e.g., receipts, special offers, coupons, or loyalty program information) may be provided to the NFC payment device for display at a screen of the smart phone or watch or storage in memory.

Figure 2:
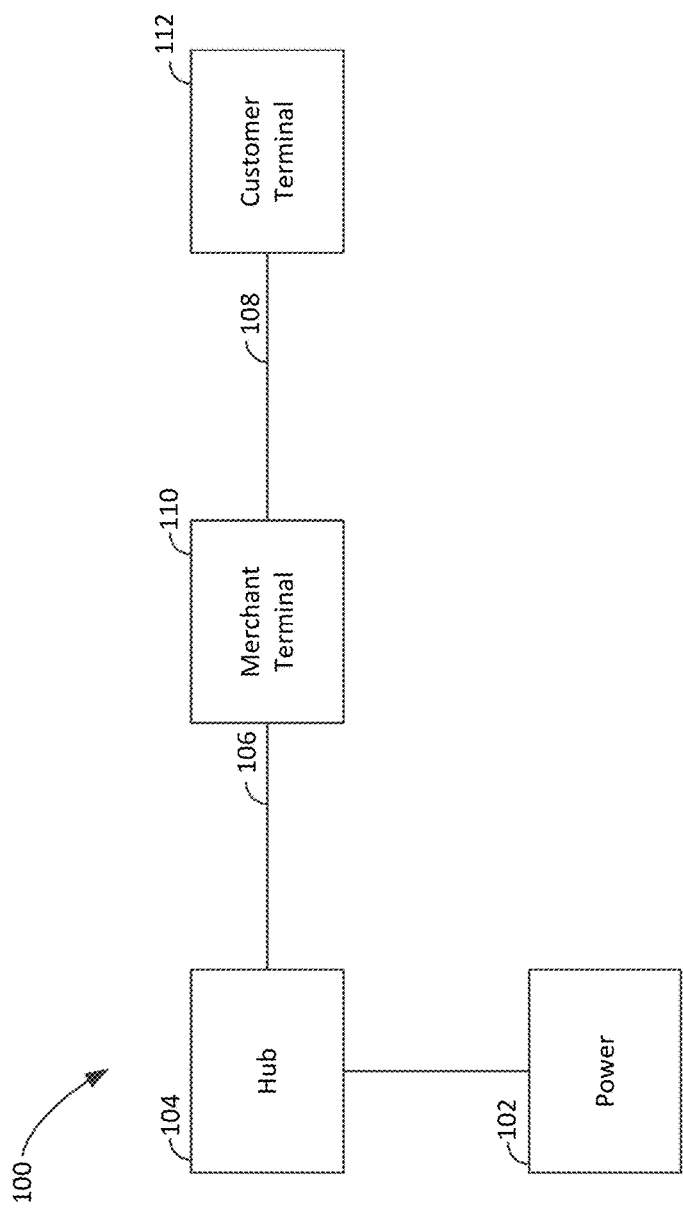
FIG. 2 depicts an illustrative block diagram a power supply, USB hub, merchant terminal and customer terminal of a point-of-sale system in accordance with some embodiments of the present disclosure.

FIG. 2 depicts an illustrative block diagram of a payment system 100 in accordance with some embodiments of the present disclosure. In one embodiment, payment system 100 includes a power supply 102, USB hub 104, USB connector 106, USB connector 108, merchant terminal 110, and customer terminal 112. These components of point-of-sale system 100 facilitate electronic payment transactions between a merchant and a customer.

In an embodiment, the power supply 102 may connect to an AC power source and convert the AC voltage into a DC voltage for use by the components of the payment system 100. A DC voltage (e.g., 12 volts) may be provided to the USB hub 104. USB hub 104 may convert the received DC voltage into a plurality of DC voltages for use in powering circuitry of the USB hub 104. The USB hub 104 allows for the merchant terminal 110 to communicate with a plurality of other USB peripherals, such as a receipt printer, cash drawer, barcode scanner, scale, keyboard, USB-Ethernet dongle/USB MiFi, and other similar peripheral devices. As described herein, the USB hub 104 may also include power supply circuitry that selectively allows the USB hub to provide a power supply signal (e.g., a 12V signal) to merchant terminal 110 via USB connector 106, and via power supply circuitry of merchant terminal 110 and USB connector 108, to customer terminal 112.

The electronic interactions between the merchant and the customer may take place between the merchant terminal 110 and the customer terminal 112. In one embodiment, the merchant terminal 110 supports an interactive computing device that is capable of processing payment information (e.g., encrypted payment card data and user authentication data) and transaction information (e.g., purchase amount and point-of-purchase information) with the customer terminal 112 and a remote payment server (not depicted). The merchant terminal 110 may include a plurality of interfaces as described herein in order to receive and provide power, to communicate with the customer terminal 112 and other devices such as a remote payment server, and to physically interface with other components such as the customer terminal 112. The interactive computing device of the merchant terminal 110 may execute the software instructions of a point-of-sale application to manage user interactions with a merchant, communications with the customer terminal 112, and communications with remote payment servers. The merchant is provided an interface through which the merchant can enter selections of purchased items, access customer information (e.g., loyalty information), check inventory, calculate taxes and fees, and otherwise perform necessary customer service and transaction steps.

Electromagnetic noise, such as RF noise may be present as a result of operation of the various devices in FIG. 2, including power source 102, USB hub 104, USB connector 106, USB connector 108, merchant terminal 110, customer terminal 112, and other components. For example, RF noise may be emitted when current is supplied to USB hub 104 from power source 102. Power supplied via USB connector 106 also can result in RF noise emission. In addition, noise may be produced and emitted by virtue of operations of the merchant terminal 110 and customer terminal 112, such as during processing operations, generation of internal power sources, and communications via USB connector 108. The RF noise may occur at a number of frequencies and harmonics thereof, including within frequency ranges used by the merchant terminal 110 and customer terminal 112 during wireless RF communications (e.g., NFC, Bluetooth, etc.). As a result, such noise can have detrimental effects on signals communicated by the merchant terminal 110 and customer terminal 112. If the noise causes sufficient distortion of the wireless signals communicated by the merchant terminal 110 and customer terminal 112, the signal to noise ratio of the wireless transmission may be reduced and data processing errors may occur at these devices. This may lead to increased transaction processing times or failures of transactions. As described in greater detail below, in some embodiments, noise management instructions stored in memory at the merchant terminal 110 and customer terminal 112 may be executed to limit the impacts of noise in order to optimize wireless communications from the merchant terminal 110 and customer terminal 112.

The customer terminal 112 may operate as a payment terminal that receives payment information from a customer, and may provide a variety of interfaces to interact with the merchant terminal 110 and a customer. A user interface of the customer terminal 112 may allow the user to interact with the customer terminal 112 in order to interact with the merchant (e.g., select items for purchase, answer queries, confirm purchases, provide PINs and signatures, etc.), receive payment information (e.g., from a swipe card, chip card, or NFC-enabled payment device) from a customer, communicate with the merchant terminal 110 (e.g., wirelessly or via USB connector 108), receive power from merchant terminal 110 (e.g., via USB connector 108), and physically attach to the merchant terminal 110 (e.g., via connecting enclosures of each of the customer terminal 112 and the merchant terminal 110).

Figure 3:
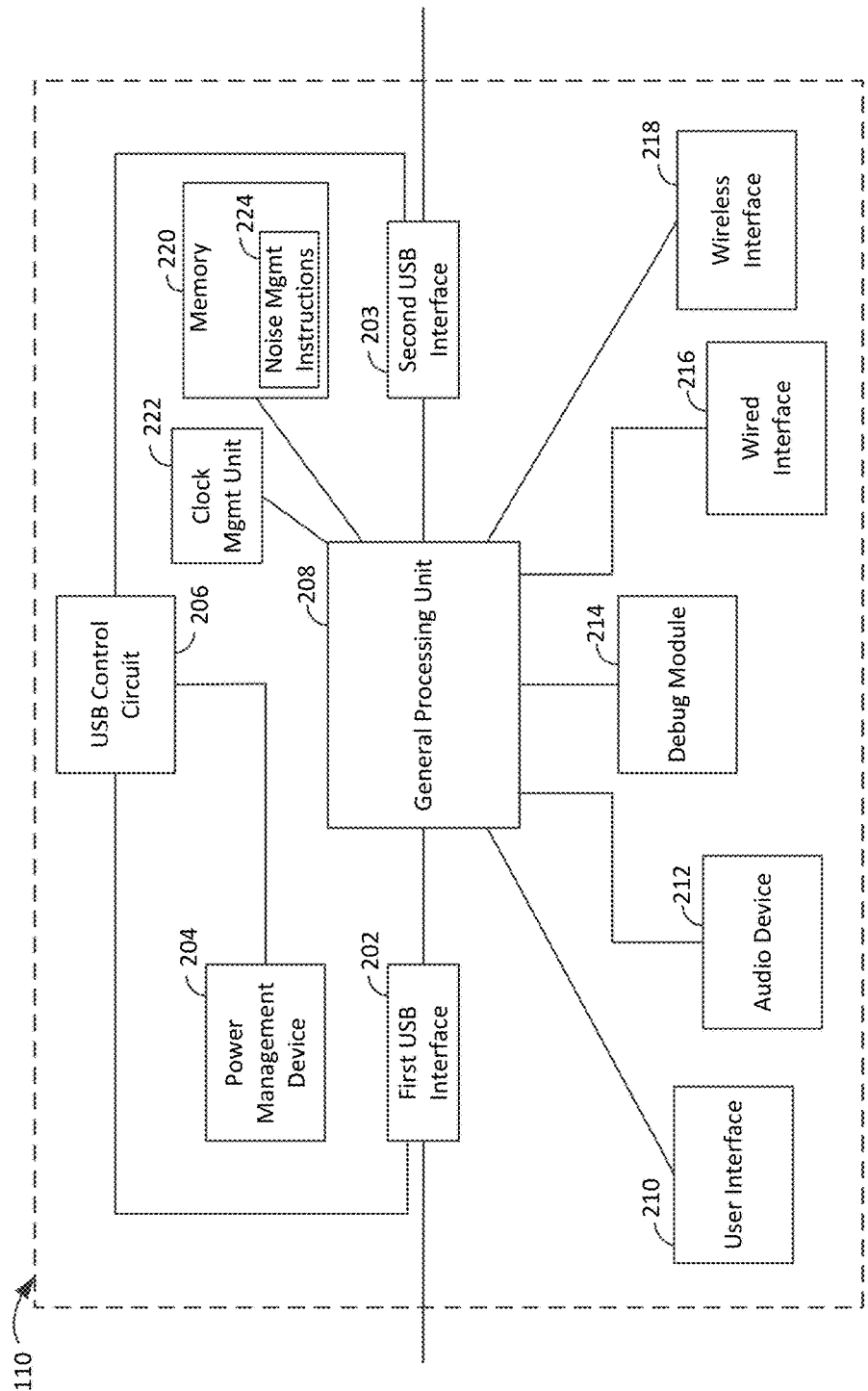
FIG. 3 depicts an illustrative block diagram of components of the merchant terminal in accordance with some embodiments of the present disclosure.

FIG. 3 depicts a block diagram of an example merchant terminal 110 in accordance with some embodiments of the present disclosure. Although particular components are depicted in a particular arrangement in FIG. 3, it will be understood that merchant terminal 110 may include additional components, one or more of the components depicted in FIG. 3 may not be included in merchant terminal 110, and the components of merchant terminal 110 may be rearranged in a variety of suitable manners. In an exemplary embodiment, the merchant terminal 110 may comprise a first USB interface 202, a second USB interface 203, a power management device 204, a USB control circuit 206, a processing unit 208, a user interface 210, an audio device 212, a debug module 214, a wired interface 216, a wireless interface 218, and a memory 220.

Processing unit 208 of merchant terminal 110 may include a processor capable of performing the processing functions of the merchant terminal 110 as described herein, and may be embodied by any suitable hardware, software, memory, and circuitry as is necessary to perform those functions. Processing unit 208 may include any suitable number of processors, and may perform the operations of merchant terminal 110 based on instructions in any suitable number of memories and memory types. In an example embodiment, the processing unit 208 may be a System-on-Chip (SoC) processor having a dual-core processor. In addition, in some embodiments, processing unit 208 of merchant terminal 110 may include clock management hardware, such as one or more chips for managing clock signals provided to the components of the merchant terminal. For example, in some embodiments, the processing unit 208 may receive a clock source signal and generate and provide clock signals such as a switching regulator clock signal, NFC clock signal, and a processing unit clock signal. The processing unit 208 may perform additional clock signal management functions for achieving the functionality described herein.

Further, the processing unit 208 may emit RF noise as part of its operations. A frequency of the RF noise may correspond to a frequency of one or more clock source signals provided to the processing unit 208 to control operations of the processing unit 208, and harmonics thereon. In this regard, the processing unit may operate at an operating frequency that corresponds to the clock signal frequency provided to the processing unit 208. An operating frequency of the processing unit 208 may thus be modified by modification to one or more clock signals provided to the processing unit 208. RF noise emitted by the processing unit 208 may similarly be modified based on modification to the operating frequency of the processing unit 208.

Processing unit 208 may execute instructions stored in memory 220 of merchant terminal 110 (e.g., noise management instructions 224) to control the operations and processing of merchant terminal 110, and memory 220 may also store information necessary for the operation of merchant terminal 110. As used herein, "memory" may refer to any suitable tangible or non-transitory storage medium. Examples of tangible (or non-transitory) storage media include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device. In an example embodiment, memory 220 may include a flash memory and a RAM memory (e.g., a 16 GB eMMC NAND flash and a 2 GB LPDDR3 RAM).

First USB interface 202 and second USB interface 203 may provide for connection of other devices or components to the merchant terminal 110 as appropriate. Although any type of USB connector and interface may be used in accordance with the present disclosure, in an embodiment each of first USB interface 202 and second USB interface 203 may be a USB type B receptacle for interfacing with a type B connector of a USB connector (e.g., USB connector 106 or 108, for connecting to USB hub 104 or customer terminal 112). In an embodiment first USB interface 202 and second USB interface 203 may be interchangeable, such that merchant terminal 110 may function in an identical manner regardless of which of the USB interfaces is coupled to USB hub 104 or customer terminal 112. In some embodiments (not depicted in FIG. 3), the merchant terminal 110 may include additional interfaces, such as additional USB ports, Lightning, Firewire, Ethernet, etc.

Although power may be provided to merchant terminal 110 in any suitable manner, in an embodiment, DC power may be provided from USB hub 104 when it is connected to the merchant terminal via first USB interface 202 or second USB interface 203. A USB control circuit 206 may include circuitry for interacting with the USB hub 104 to receive the incoming DC power signal and to distribute that signal to other components of the merchant terminal 110 (e.g., via power management device 204) and to the customer terminal 112 (e.g., via the other USB interface of first USB interface 202 and second USB interface 203). A power management device 204 (e.g., a discrete power management integrated circuit) may receive power provided from USB hub 104 through one of the USB interfaces (first USB interface 202 or second USB interface 203) and USB control circuit 206, and may perform functions related to power requirements of a host system (e.g., DC to DC conversion, battery charging, linear regulation, power sequencing and other miscellaneous system power functions).

In some embodiments, the power management device 204 may include switching regulator hardware for modifying power signals provided to the resources and components of merchant terminal 110. In some embodiments, the switching regulator hardware may be various types of switching regulators, such as a buck, boost, or other types of switching regulator. The switching regulator hardware may boost voltage provided from the USB hub 104 before providing it to other components of the merchant terminal 110. As a result of such modification, the switching regulator hardware may emit noise at various frequencies, including noise at frequencies in RF frequency bands that may affect RF communication signals transmitted and received by the merchant terminal 110. In some embodiments, the merchant terminal 110 may comprise one or more switching regulators, each of which may emit RF noise or noise in other frequency bands as part of its operations. As described further below, one or more processors (e.g., processing unit 208) of the merchant terminal 110 may execute instructions to compensate for RF noise emitted by the switching regulator hardware by optimizing and coordinating operations of switching regulator hardware and other components of the merchant terminal 110.

Merchant terminal 110 may also include a user interface 210. User interface 210 may provide various interfaces and outputs to the merchant terminal 110 to be viewed by a merchant. An example user interface 210 may include hardware and software for interacting with a user, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant terminal 110. The user interface 210 may comprise other components in other embodiments.

In some embodiments, the user interface 210 may be positioned adjacent to components of the merchant terminal 110 configured to communicate wireless signals. The user interface 210 may emit RF noise as part of its operation, which may cause distortion of RF signals sent and received by the wireless interface 218, such as when one or more frequency bands of the RF noise overlaps one or more RF communication frequency bands. In some embodiments, a frequency of the noise emitted by the user interface 210 may correspond to an operating frequency of the user interface 210. For example, when the user interface 210 is implemented as a touchscreen interface, the touchscreen may be configured to operate (e.g., provide outputs and receive user inputs) at an initial operating frequency, such as approximately 50-100 Hz. Such initial operating frequency may be based on a clock signal provided at an initial clock frequency (e.g., from a clock management unit coupled to the processing unit 208). This initial clock frequency may cause the user interface 210 to perform operations at the initial operating frequency: that is, the initial operating frequency of the user interface 210 may be based on the initial clock frequency provided to the user interface 210. In this regard, one or more frequency bands of the noise emitted by the user interface 210 when operating at the initial operating frequency may overlap one or more RF communication frequency bands of RF communication interfaces of the merchant terminal 110, such as an NFC frequency or Bluetooth frequency of communications from wireless interface 218. As will be described further below, the user interface 210 may be operable to perform operations at a modified operating frequency, such as in response to receiving a modified clock frequency from the clock management unit (e.g., in response to modification by the processing unit 208 or clock management unit 222). Such modified operations may result in the user interface 210 emitting noise at one or more modified noise frequencies. In some embodiments, none of the one or more modified noise frequencies may overlap any of the one or more RF communication frequencies of the merchant terminal 110. Other modifications to operations of the user interface 210 may be performed in other embodiments, including by techniques other than modifying an operating frequency of the user interface 210.

Merchant terminal 110 may also include an audio device 212. Audio device 212 may provide audio for the merchant terminal 110. An example audio device 210 may comprise an audio amplifier and a speaker for providing appropriate audio for the merchant terminal 110. The merchant terminal 110 may comprise other components in other embodiments.

Merchant terminal 110 may also include a debug module 214. In an embodiment, a debug module may provide an interface and processing for performing debug operations (e.g., by a technician utilizing a debug device), such as identifying and removing defects that prevent correct operation of the merchant terminal 110 and the various components thereof. In some embodiments, the functionality of debug module 214 may only be initiated in response to a predetermined self-test input, such that the debug interface is not externally accessible through a communication interface.

Merchant terminal 110 may also include a wired interface 216, which may include a suitable interface for wired communication, such as USB, Lightning, FireWire, Ethernet, any other suitable wired communication interface, or any combination thereof, to perform, for example, the wired communication with other devices of the payment system 100 and payment servers (e.g., via a secure internet connection).

Merchant terminal 110 may also include a wireless communication interface 218. The wireless communication interface 218 may include suitable hardware and software for providing a wireless communication interface such as radio frequency (RF), Bluetooth classic, Bluetooth low energy, WiFi, cellular, short message service (SMS), NFC, any other suitable wireless communication interface, or any combination thereof. In an example embodiment, the wireless communication interface 218 may facilitate communications between the merchant terminal 110 and peripherals, as well as with payment servers (e.g., via a secure internet connection).

In some embodiments, wireless communication interface 218 may be configured for communicating (e.g., sending and receiving) wireless signals at one or more frequencies used for wireless communications. For example, signals sent and received at the wireless interface 218 may include signals communicated based on one or more frequencies of the respective protocols described herein, such as an NFC carrier signal at a 13.56 MHz frequency, an 800 kHz NFC data modulation frequency, 2.4 GHz for Bluetooth classic protocol, Bluetooth channels in a 20-25 MHz band, etc. Each signal may have a phase, amplitude, frequency, modulation method, and other characteristics. In some embodiments, wireless signals communicated by the merchant device 110 may be communicated based on one or more other wireless communication frequencies. In addition, the signals sent and received at the wireless communication interface 218 may include RF noise at various frequencies. The RF noise may be present in signals communicated at various frequencies, including frequencies that overlap communication frequency bands of signals sent and received at the wireless communication interface 218. RF signals may be received at an antenna of the wireless communication interface 218, and may be provided for processing at the merchant terminal 110, such as by processing unit 208. In this regard, various components of the merchant terminal 110 may function as a receive circuit for receiving wireless communications (e.g., NFC, Bluetooth, etc.).

In some embodiments, wireless communication interface 218 may be positioned approximately adjacent to or in close proximity to the user interface 210. As described above, the user interface 210 may emit RF noise across various frequencies as part of its operation. Such RF noise can interfere with communication of signals at the wireless communication interface 218 when one or more noise frequencies overlap one or more communication frequencies of the merchant terminal 110. According to the techniques described herein, noise frequency bands of noise emitted by components of the merchant terminal 110, such as the user interface 218, can be shifted during periods when communications are sent or received at the wireless communication interface 218 so that no overlap of such frequencies occurs.

Clock management unit 222 may include software, hardware or various combinations thereof for generating and managing clock signals provided to various components of the merchant terminal 110, such as to a clock input pin of various components of the merchant terminal 110. In some embodiments, the clock management unit 222 may be implemented as one or more chips, and may comprise suitable logic for generating and providing clock signals as desired. Exemplary clock signals generated by the clock management unit include one or more clock signals provided to one or more switching regulators, a wireless communication interface 218, and processing unit 208. Each clock signal provided by the clock management unit 222 may have a desired phase, amplitude, frequency, and duty cycle. In addition, the clock management unit 222 may be configured for receiving a clock source signal, such as from the processing unit 208, and to generate and provide one or more clock signals based on the clock source signal.

Noise management instructions 224 may be stored in memory 220 and may include instructions for optimizing communication of wireless signals and for coordinating operations between a wireless communication source and a RF noise source of the merchant terminal 110. The noise management instructions 224 may include instructions for controlling operations of essentially any or various combinations of resources of the merchant terminal 110 to achieve the optimization and coordination operations described herein, and may include instructions for performing various tasks described herein simultaneously or at various times. In addition, functionality ascribed to the noise management instructions 224 may be distributed among other instructions stored in memory 220, and may be implemented using software, firmware, hardware, or various combinations thereof.

Noise management instructions 224 may include instructions for controlling a clock management unit of the merchant terminal 110 to generate a plurality of clock signals. In some embodiments, the plurality of clock signals may include various types of clock signals provided to components or resources of the merchant terminal 110. For example, clock signals that may be generated by the clock management unit of merchant terminal 110 can include a switching regulator clock signal, an NFC clock signal, and a processing unit clock signal. Each of the plurality of clock signals generated by the clock management unit in response to execution of noise management instructions 224 may have a phase, frequency, amplitude, and duty cycle, and may be controlled or configured as described herein. In some embodiments, other signals in addition to the system described herein may be generated based on instructions 224.

Noise management instructions 224 may include instructions for generating a switching regulator clock signal. In some embodiments, one or more switching regulators of the merchant terminal 110 may emit RF noise. The RF noise may be based on an operating frequency of the one or more switching regulators. By controlling a clock signal provided to the one or more switching regulators, a clock management unit (e.g., processing unit 208 executing noise management instructions 224) of the merchant terminal 110 may be configured to identify RF noise. Noise management instructions 224 may include instructions for providing the switching regulator clock signal to the one or more switching regulators of the merchant terminal 110. The switching regulator clock signal may have a phase and frequency, and in some embodiments, the same switching regulator clock signal may be provided to multiple switching regulators of the merchant terminal 110. In this regard, each of the switching regulators of the merchant terminal 110 may operate based on the same clock signal, which may have a phase, frequency, amplitude, and duty cycle. In other embodiments, different clock signals may be provided to different switching regulators. In this regard, noise management instructions 224 may include instructions for determining a phase and frequency of the switching regulator clock signal that may be used to identify RF noise.

In some embodiments, noise management instructions 224 may include instructions for generating a wireless clock signal such as an NFC clock signal at the clock management unit 222. The NFC clock signal may be provided to the processing unit 208 of the merchant terminal 110 and/or the wireless interface 218 for performing wireless communications (e.g., at wireless interface 218), such as via RF communication using NFC. In other embodiments involving different communications methods, the wireless clock signal may correspond to a frequency for the communication method (e.g., Bluetooth). In some embodiments, the NFC clock signal may have a phase and frequency that corresponds to a phase and frequency of one or more wireless communication frequencies of the merchant terminal 110. For example, in some embodiments, the NFC clock signal may have a phase and frequency that corresponds to a phase and frequency of the NFC carrier signal (e.g., 13.56 MHz), as modulated during communication (e.g., at 800 kHz). A phase and frequency of the NFC clock signal may constitute a baseline phase and frequency for detecting noise in a received wireless communication signal. For example, a received wireless communication signal may have noise on it that causes variations of the data signal, such that an amplitude, phase, and/or frequency differs from the phase and frequency of the NFC clock signal by an amount greater than a pre-defined threshold. Noise management instructions 224 may include instructions for determining that an amount by which the amplitude, phase and/or frequency of the NFC clock signal and the received wireless communication exceeds the threshold and thus represents unacceptable noise. Note that in some embodiments, noise management instructions may include instructions for receiving a RF signal at the merchant terminal 110, such as from wireless communication interface 218. The merchant terminal 110 may receive other types of wireless signals in other embodiments, and such other wireless signals may include RF noise. Noise management instructions 224 may include instructions for processing each wireless signal received at a merchant terminal 110 according to the techniques described herein. Other techniques for processing wireless signals received at merchant terminal 110 may be possible in other embodiments.

In some embodiments, noise management instructions 224 may include instructions for determining a plurality of possible sampling times for the received wireless signal (e.g., a received modulated NFC signal) based on a phase and frequency of a clock signal provided to the processing unit 208. The processing unit 208 may process data based on a frequency of the clock signal provided to the processing unit 208. A rate at which sampling of the received NFC signal may be may be performed thus may be determined based on a frequency and phase of a clock signal provided to the processing unit 208, and further based on when possible sampling times correspond to times when data is received and noise is minimized. As noted above, the wireless communication signal received at the merchant terminal 110 may have a phase and frequency which may be based on a wireless carrier signal phase and frequency, and a RF noise source may also have a phase and frequency. Thus, the times at which processing unit 208 may perform sampling of the wireless communication signal may be based on a phase and frequency of the processing unit clock signal and times when the data of the received wireless signal us less likely to be impacted by noise. In this regard, noise management instructions 224 may include instructions for identifying a plurality of possible sampling times that may be compared with time periods during in which noise present in a received wireless communication signal is below a threshold.

Noise management instructions 224 may include instructions for identifying a noise threshold for determining times at which the noise present in a received wireless communication signal is reduced. A noise threshold may be indicative of a value of noise that may allow processing of the wireless communication signal with a desired (e.g., reduced) number of errors. By processing (e.g., sampling) the received wireless communication signal during such times when noise falls below the noise threshold, errors in processing the received wireless signal at the processing unit 208 may be reduced. Noise management instructions 224 may include instructions for determining a noise threshold based on measured or predicted differences between phases and frequencies of various signals at the merchant device 110, but in some embodiments, a threshold may be determined based on a first phase difference and a first frequency difference. In an exemplary embodiment, the first phase difference may be based on a difference between a phase of the switching regulator clock signal and a phase of the NFC clock signal. The first frequency difference may be based on a difference between a frequency of the switching regulator clock signal and a frequency of the NFC clock signal. Again, other information may be used to identify a suitable noise threshold in other embodiments.

Noise management instructions 224 may include instructions for identifying time periods when RF noise is below a noise threshold. By identifying the time periods when a noise value (e.g., an aggregate value of RF noise emitted by components such as the one or more switching regulators) falls below the threshold, the received wireless communication signal may be sampled for processing at such times at the processing unit 208. In this regard, portions of the wireless communication signal sampled for processing at the processing unit 208 may have RF noise that is below the noise threshold, reducing noise-related errors. The noise management instructions 224 may include instructions for aggregating RF noise present due to the one or more switching regulators and RF noise present in the received wireless communication signal (e.g., as may be received by the NFC receive circuit at wireless communication interface 218), determining a value associated with the RF noise, and comparing it with the threshold. Such aggregation and comparison may be performed at a desired number of time periods, such as based on one or more of the switching regulator clock signal, NFC clock signal, and processing unit clock signal. In this regard, the noise management instructions 224 may include instructions for identifying a plurality of time periods at which the RF noise falls below the threshold.

Noise management instructions 224 may include instructions for comparing sampling times for the processing unit 208 (e.g., based on the processing unit clock signal) with the plurality of time periods during which RF noise is below the noise threshold and identifying the time periods which correspond with the sampling times. By comparing times from the plurality of time periods with the plurality of possible sampling times for the processing unit 208, periods when sampling of the received wireless communication signal with RF noise that is below the noise threshold may be possible. In this regard, the noise management instructions 224 may include instructions for causing the processing unit 208 to perform sampling of the signal at time periods from the plurality of time periods that correspond to sampling times from the plurality of possible sampling times. In this regard, the received wireless communication signal sampled by the processing unit 208 may be processed at times during which RF noise present at the merchant device 110 is below the noise threshold. Other techniques for processing the received wireless communication signal during times when RF noise at the merchant device 110 is below a noise threshold may be possible in other embodiments.

In some embodiments, the noise management instructions 224 may include instructions for coordinating operations between a wireless communication source of the merchant terminal 110 and a source of RF noise within the merchant terminal 110. By coordinating operations the wireless communication components of the merchant terminal 110 and various sources of RF noise within the merchant terminal 110, signal quality and communication efficiency of wireless communication signals communicated by the merchant terminal 110 may be improved. Processing unit 208 may execute noise management instructions 224 to perform such coordination according to the techniques described herein, but it will be understood that similar techniques for coordinating operations of the components of the merchant terminal 110 for management of RF noise may be possible in other embodiments.

Noise management instructions 224 may include instructions for monitoring operation of wireless communication resources of merchant terminal 110, such as clock signals provided to processing unit 208 and signals received via wireless communication interface 218 to identify periods of time during which wireless communications are occurring. For example, operations of sources of RF noise may be modified or altered as desired in order to modify frequency bands of RF noise emitted by the RF noise source. In this regard, an operating frequency of one or more of the noise sources may be modified by modifying a clock signal provided to the one or more noise sources. In this regard, modification of the clock signal frequency may result in modification of a frequency of the RF noise. RF noise thus may be shifted to one or more frequency bands that do not overlap with any portion of the wireless communication frequency band in use at the merchant terminal.

Noise management instructions 224 may include instructions for identifying an operating frequency of one or more RF noise sources, such as based on a clock signal provided to the RF noise source. Resources of the merchant terminal 110 may emit RF noise during operation. RF noise may be emitted by processing unit 208, user interface 218, one or more switching regulators, or other components that operate at a frequency. A frequency of RF noise emitted by the RF noise source may be based upon an operating frequency of the noise source, which in turn may be based upon a frequency of a clock signal provided to the RF noise source. In this regard, one or more frequencies of RF noise may correspond to one or more operating frequencies of the RF noise source. An operating frequency may be modified by modifying a frequency of a clock signal provided to the RF noise source (e.g., from clock management unit 222). In this regard, the noise management instructions may include instructions for modifying one or more frequencies of RF noise by modifying a clock signal frequency of the one or more RF noise sources.

Noise management instructions 224 may include instructions for determining that the merchant terminal 110 is communicating at one or more wireless communication frequencies. Noise management instructions 224 may include instructions for identifying periods when the merchant terminal is communicating wirelessly, such as based on characteristics (e.g., phase, frequency, etc.) of one or more clock signals provided to processing unit 208. For example, wireless communication may be occurring when a clock signal frequency provided to the wireless communication interface corresponds to a wireless communication frequency, when a transmission voltage or current is being provided to a transmit signal, or when the processing unit is performing communications functions.

Noise management instructions 224 may include instructions for determining that one or more frequencies of RF noise emitted by a RF noise source overlap at least a portion of RF communication frequencies that the merchant terminal 110 is using for wireless communication. For example, noise management instructions 224 may compare one or more RF noise frequencies with frequencies used in various wireless communication protocols at the merchant terminal 110, such as Bluetooth channel frequency bands (e.g., indicated on a Bluetooth channel map stored in memory 220), NFC frequencies, etc. If a frequency of RF noise falls within a range of frequencies for wireless communication, the noise management instructions may determine that a frequency of the RF noise overlaps at least a portion of the one or more wireless communication frequencies. Other techniques for determining whether an RF noise frequency overlaps one or more wireless frequency bands are possible in other embodiments.

Noise management instructions 224 may include instructions for modifying an operating phase or frequency of one or more RF noise sources. The one or more RF noise sources may normally operate at an initial operating frequency. For example, a processing unit 208 may receive an initial clock signal that causes the processing unit 208 to perform processing operations at an operating frequency that corresponds to the initial clock signal frequency. In an embodiment, user interface 218 may receive an initial clock signal that has an initial clock signal frequency and may perform operations of user interface 218 (e.g., touchscreen 218) at an operating frequency that corresponds to the initial clock signal frequency. Note that one or more clock signals may be provided to the one or more RF noise sources, and in some embodiments, such clock signals may be provided by clock management unit 222 of merchant terminal 110. As noted above, an operating frequency of an RF noise source may correspond to a frequency of RF noise emitted by the RF noise source. In this regard, an initial operating frequency of the RF noise source may be modified, such as by modifying an initial clock signal frequency provided to the RF noise source. A frequency of RF noise emitted by the RF noise source thus may be modified based on the modified operating frequency.

In some embodiments, operations that are performed by the RF noise source may be a standard set of operations, and the operations may be modified to a reduced set of operations to limit RF noise emitted by the RF noise source. In some embodiments, noise management instructions 224 may include instructions for causing the one or more RF noise sources to perform a modified (e.g., reduced) set of operations, such as by reducing power for certain operations or foregoing normal processing operations. In some embodiments, the reduced set of operations may correspond to operations that are possible at the modified operating frequency based on receipt of a modified clock signal. In addition, noise management instructions 224 may include instructions for determining that the merchant terminal 110 is no longer communicating wirelessly (e.g., based on monitoring of signals provided to the wireless communication interface 218) and causing one or more RF noise sources to return to performing standard operations. In some embodiments, a clock signal provided to the one or more RF noise sources may return to an initial operating frequency once wireless communications are complete.

Figure 4:
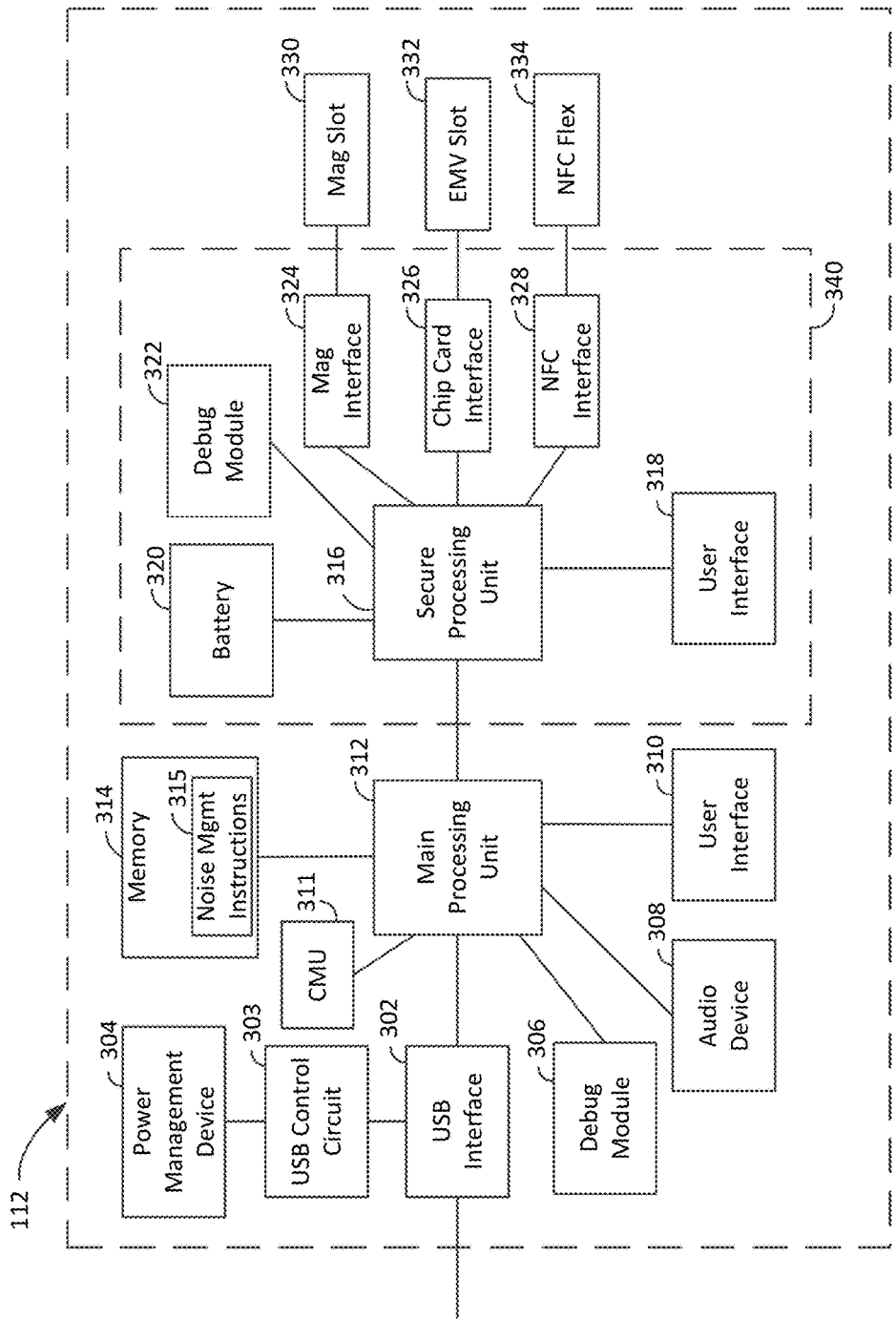
FIG. 4 depicts an illustrative block diagram of components of the customer terminal in accordance with some embodiments of the present disclosure.

FIG. 4 depicts a block diagram of an exemplary customer terminal 112 in accordance with some embodiments of the present disclosure. Although particular components are depicted in a particular arrangement in FIG. 4, it will be understood that customer terminal 112 may include additional components, one or more of the components depicted in FIG. 4 may not be included in customer terminal 112, and the components of customer terminal 112 may be rearranged in a variety of suitable manners. In one embodiment, customer terminal 110 may comprise a USB interface 302, a power management device 304, a debug module 306, an audio device 308, a user interface 310, a clock management unit 311, a main processing unit 312, a memory 314, a secure enclave 340, a magnetic swipe slot 330, an EMV slot 332, and an NFC flex circuit 334.

Clock management unit 311 may include software, hardware or various combinations thereof for generating and managing clock signals provided to various components of the customer terminal 112, such as to a clock input pin of various components of the customer terminal 112. In some embodiments, the clock management unit 311 may be implemented as one or more chips, and may comprise suitable logic for generating and providing clock signals as desired. Exemplary clock signals generated by the clock management unit include one or more clock signals provided to one or more switching regulators, a NFC interface 328, and main processing unit 312. Each clock signal provided by the clock management unit 311 may have a desired phase, amplitude, frequency, and duty cycle. In addition, the clock management unit 311 may be configured for receiving a clock source signal, such as from the main processing unit 312, and to generate and provide one or more clock signals based on the clock source signal. Note that, although clock management unit 311 is depicted as being coupled to main processing unit 312, the clock management unit 311 may be coupled to provide clock signals to various resources of customer terminal 112 to achieve the functionality described herein, including to main processing unit 312, secure processing unit 316, user interface 310 and 318, and NFC interface 328.

Main processing unit 312 of customer terminal 112 may include a processor capable of performing the processing functions of the customer terminal 112 as described herein, and may be embodied by any suitable hardware, software, memory, and circuitry as is necessary to perform those functions. Main processing unit 312 may include any suitable number of processors, and may perform the operations of customer terminal 112 based on instructions in any suitable number of memories and memory types. In an example embodiment, the main processing unit 312 may be a System-on-Chip (SoC) processer having a dual-core processor (e.g., a Dual core ARM Cortex A7/A9).

Main processing unit 312 may execute instructions stored in memory 314 of customer terminal 112 to control the operations and processing of customer terminal 112, and the memory 314 may also store information necessary for the operation of customer terminal 112. In an example embodiment, memory 314 may include a flash memory and a RAM memory (e.g., a 16 GB eMMC NAND flash and a 2 GB LPDDR3 RAM). Memory 314 may include instructions (e.g., noise management instructions 315) for optimizing NFC communication and coordinating operation of RF communication sources with RF noise sources at the customer terminal 112.

USB interface 302 may provide for a connection to the merchant terminal 110 in order to receive power from merchant terminal 110 and to communicate with the merchant terminal 110. Although any type of USB connector and interface may be used in accordance with the present disclosure, in an embodiment USB interface 302 may be a USB type B receptacle for interfacing with a micro USB type B connector of a USB connector (e.g., USB connector 106 or 108, for connecting to merchant terminal 110). In some embodiments (not depicted in FIG. 4), customer terminal 112 may include additional wired or wireless interfaces such as additional USB ports, Lightning, Firewire, Ethernet, WiFi, Bluetooth, etc.

Although power may be provided to customer terminal 112 in any suitable manner, in an embodiment DC power may be provided from merchant terminal 110 when it is connected to the customer terminal 112 via the USB interface 302. A USB control circuit 303 may include circuitry for interacting with the merchant terminal 110 to receive the incoming DC power signal and to distribute that signal to other components of the customer terminal 112 (e.g., via power management device 304). In some embodiments, USB control circuit 303 may enable additional functionality, such as initiating a reprogramming mode for the customer terminal based on a received voltage at USB interface 302. A power management device 304 (e.g., a discrete power management integrated circuit) may receive power provided from merchant terminal 110 through the USB interface 302 and USB control circuit 303, and may perform functions related to power requirements of the customer system (e.g., DC to DC conversion, battery charging, linear regulation, power sequencing and other miscellaneous system power functions).

Customer terminal 112 may also include a user interface 310. User interface 310 may provide various interfaces and outputs to the customer terminal 112 to be viewed by a customer. An example user interface 310 may include hardware and software for interacting with a customer, such as a touchscreen interface, voice command interface, keyboard, mouse, gesture recognition, any other suitable user interface, or any combination thereof. In one embodiment, the user interface 310 may be a touchscreen device that displays an interactive user interface for the customer to engage in purchase transactions (e.g., select items for purchase, answer queries, confirm purchases, provide PINs and signatures, etc.) at the customer terminal 112.

In some embodiments, the user interface 310 may be positioned adjacent to components of the customer terminal 112 configured to perform wireless communication. The user interface 310 may emit RF noise as part of its operation, which may cause distortion of signals sent and received by the NFC interface 328 when one or more frequency bands of the noise overlap one or more communication frequency bands. In some embodiments, a frequency of the noise emitted by the user interface 310 may correspond to an operating frequency of the user interface 310. For example, when the user interface 310 is implemented as a touchscreen interface, the touchscreen may be configured to operate (e.g., provide outputs and receive user inputs) at an initial operating frequency, such as approximately 50-100 Hz. Such initial operating frequency may be based on a clock signal provided at an initial clock frequency (e.g., from a clock management unit 311 coupled to the main processing unit 312 and secure processing unit 316). This initial clock signal may cause the user interface 310 to perform operations at the initial operating frequency: that is, the initial operating frequency of the user interface 310 may be based on the initial clock frequency provided to the user interface 310. In this regard, one or more frequencies of the noise emitted by the user interface 310 when operating at the initial operating frequency may overlap one or more wireless communication frequencies of RF communication interfaces of the customer terminal 112, such as an NFC frequency band or Bluetooth frequency band of communications from NFC interface 328. As will be described further below, the user interface 310 may be operable to perform operations at a modified operating frequency, such as in response to receiving a modified clock signal from the clock management unit (e.g., in response to modification by the main processing unit 312 or secure processing unit 316). Such modified operations may result in the user interface 310 emitting noise at one or more modified noise frequencies. In some embodiments, none of the one or more modified noise frequencies may overlap any of the one or more RF communication frequencies of the customer terminal 112. Other modifications to operations of the user interface 310 may be performed in other embodiments, including by techniques other than modifying an operating frequency of the user interface 310.

Customer terminal 112 may also include an audio device 308. Audio device 308 may provide audio for the customer terminal 112. An example audio device 308 may comprise an audio amplifier and a speaker for providing appropriate audio for the customer terminal 112. The audio device 308 may comprise other components in other embodiments.

Customer terminal 112 may also include a debug module 306. In an embodiment, a debug module 306 may provide an interface and processing for performing debug operations (e.g., by a technician utilizing a debug device), such as identifying and removing defects that prevent correct operation of the customer terminal 112 and the various components thereof. In an embodiment, debug module 306 may be secured using various techniques. Debug module 306 may restrict or reject communications (e.g., a signal) received from the debug module 306 unless the communication is from an approved device. For example, instructions stored in memory, such as memory 314, may include instructions (e.g., noise management instructions 315) for optimizing NFC communication and coordinating operation of RF communication sources with RF noise sources at the customer terminal 112. In some embodiments, the functionality of debug module 306 may only be initiated in response to a predetermined self-test input, such that the debug interface is not externally accessible through a communication interface. In some embodiments, debug module 306 may be secured physically, such as by use of a filter, switch or other device. Other techniques for securing debug module 306 may be used in other embodiments.

The secure enclave 340 may be a secure portion of the customer terminal 112 that performs critical functionality such as interacting with payment devices and cryptography, and that stores sensitive information such as cryptographic keys, passwords, and user information. In an embodiment, the secure enclave 340 may be located in a distinct location of the customer terminal 112 to isolate the secure enclave 340 from other circuitry of the customer terminal 112 and to allow protective measures (e.g., tamper detection switches, anti-tamper meshes, anti-tamper domes, isolated compartments, etc.) to be installed near and around the secure enclave 340 (not depicted in FIG. 4). In an example embodiment, the secure enclave 340 may be situated at a portion of the customer terminal 112 in a manner that provides additional physical clearance for protective measures.

In an embodiment, the secure enclave 340 may include a secure processing unit 316, a user interface 318, a battery 320, a debug module 322, a magnetic swipe interface 324, a chip card interface 326, and an NFC interface 328.

Although secure processing unit 316 may be implemented with any suitable processor, hardware, software, or combination thereof, in an embodiment, secure processing unit 316 may be implemented as microcontroller unit (MCU). Secure processing unit 316 may perform transaction processing and cryptographic operations, based on instructions and information (e.g., customer data, encryption keys, etc.) stored in a memory of secure processing unit 316 (not separately depicted in FIG. 4), which may be any suitable memory as described herein. Secure processing unit 316 may communicate with main processing unit 312 in order to receive and respond to requests for processing of payment information. Communications may be performed using any suitable internal bus and communication technique (e.g., UART, SPI, I²C, and GPIO).

The secure enclave 340 of customer terminal 112 may also include a battery 320. In some embodiments, the battery 320 may function as a primary power source to certain components of the secure enclave 340 (e.g., memory storing critical payment, customer, and encryption information), such that when the battery power is removed the information is lost. The battery 320 may function in this manner in response to a tamper attempt, such that in response to the tamper attempt, the secured information is destroyed.

The secure enclave 340 of customer terminal 112 may also include a debug module 322. In an embodiment, a debug module 322 may provide an interface and processing for performing debug operations (e.g., by a technician utilizing a debug device) directly with the components of the secure enclave. In some embodiments, the functionality of debug module 322 may only be initiated in response to a predetermined self-test input, such that the debug interface is not externally accessible through a communication interface.

The secure enclave 340 of customer terminal 112 may also include a user interface 318. In an embodiment, user interface 318 (e.g., a keypad, touchscreen, etc.) may be located within the secure enclave such that certain content is provided to the secure enclave 340 rather than the general processing circuitry of the customer terminal 112. In this manner, critical information such as PIN numbers, signatures, and passwords may be provided only to the secure enclave 340 in the first instance, and then forwarded to the main processing unit 312 in encrypted or unencrypted form, as required. In some embodiments, the user interface 318 may emit RF noise during operation in a manner similar to that of user interface 310, such as when user interface 318 is implemented as a touchscreen. In this regard, operations of user interface 318 may be controlled using essentially the same or similar techniques as described herein with regard to user interface 310 to optimize NFC communication or manage noise emitted by one or more RF noise sources, including user interface 318.

Secure enclave 340 of customer terminal 112 may also include a magnetic swipe interface 324, chip card interface 326, and NFC interface 328. Each of these components may include interface circuitry for receiving and processing signals from a payment interface, such as a magnetic reader head 330, a chip card slot 332 (e.g., providing power and communications to the chip card), and an NFC circuit, components of which may be located on an NFC flex circuit 334 remote from secure enclave 340. For example, instructions stored in memory, such as memory 314, may include instructions for disabling secure enclave 340 and limiting or rejecting communications at magnetic swipe interface 324, chip card interface 326, and NFC interface 328. Other techniques for interfaces of secure enclave 340 may be used in other embodiments.

In some embodiments, NFC interface 328 may be configured for communicating (e.g., sending and receiving) wireless signals at frequencies used for wireless communications. For example, signals sent and received at the NFC interface 328 may include signals communicated based on one or more frequency frequencies of the respective protocols described herein, such as an NFC carrier signal at a 13.56 MHz frequency, an 800 kHz NFC data modulation frequency. Each signal may have a phase, amplitude, frequency, or other characteristics. In some embodiments, signals may be communicated based on one or more other wireless communication frequency bands. In addition, the signals sent and received at the NFC interface 328 may include noise coupled thereon at various frequencies. The noise may be present in signals communicated at various frequencies, including frequencies that overlap communication frequency bands of signals sent and received at the NFC interface 328. Signals received at the NFC interface 328 may be provided for processing at the customer terminal 112, such as by secure processing unit 316 or main processing unit 312. In this regard, various components of the customer terminal 112 may function as a receive circuit for receiving wireless communications (e.g., NFC, Bluetooth, etc.).

In some embodiments, NFC interface 328 may be positioned approximately adjacent to or in close proximity to the user interfaces 310 and 318. As described above, the user interfaces 310 and 318 may emit noise in various frequency bands as part of its operation. Such noise can interfere with communication of signals at the NFC interface 328 when one or more noise frequency bands overlap one or more communication frequency bands of the customer terminal 112. According to the techniques described herein, noise frequency bands of noise emitted by components of the customer terminal 112, such as the user interfaces 310 and 318, can be shifted during periods when communications are sent or received at the NFC interface 328 so that no overlap of such frequency bands occurs.

Noise management instructions 315 may be stored in memory 314 and may include instructions for optimizing communication of wireless signals and for coordinating operations between a wireless communication source and a wireless noise source of the customer terminal 112. In an exemplary embodiment, noise management instructions 315 may operate include some or all of the functionality of noise management instruction 224, as applied to the particular RF noise sources (e.g., power management device 304, user interface 310, main processing unit 312, secure processing unit 316, user interface 318, and chip card interface 326), communication interfaces (e.g., NFC interface 328 and NFC Flex 334, a Bluetooth transponder (not depicted), etc.), and control circuitry (e.g., CMU 311) of the customer terminal 112.

Figure 5:
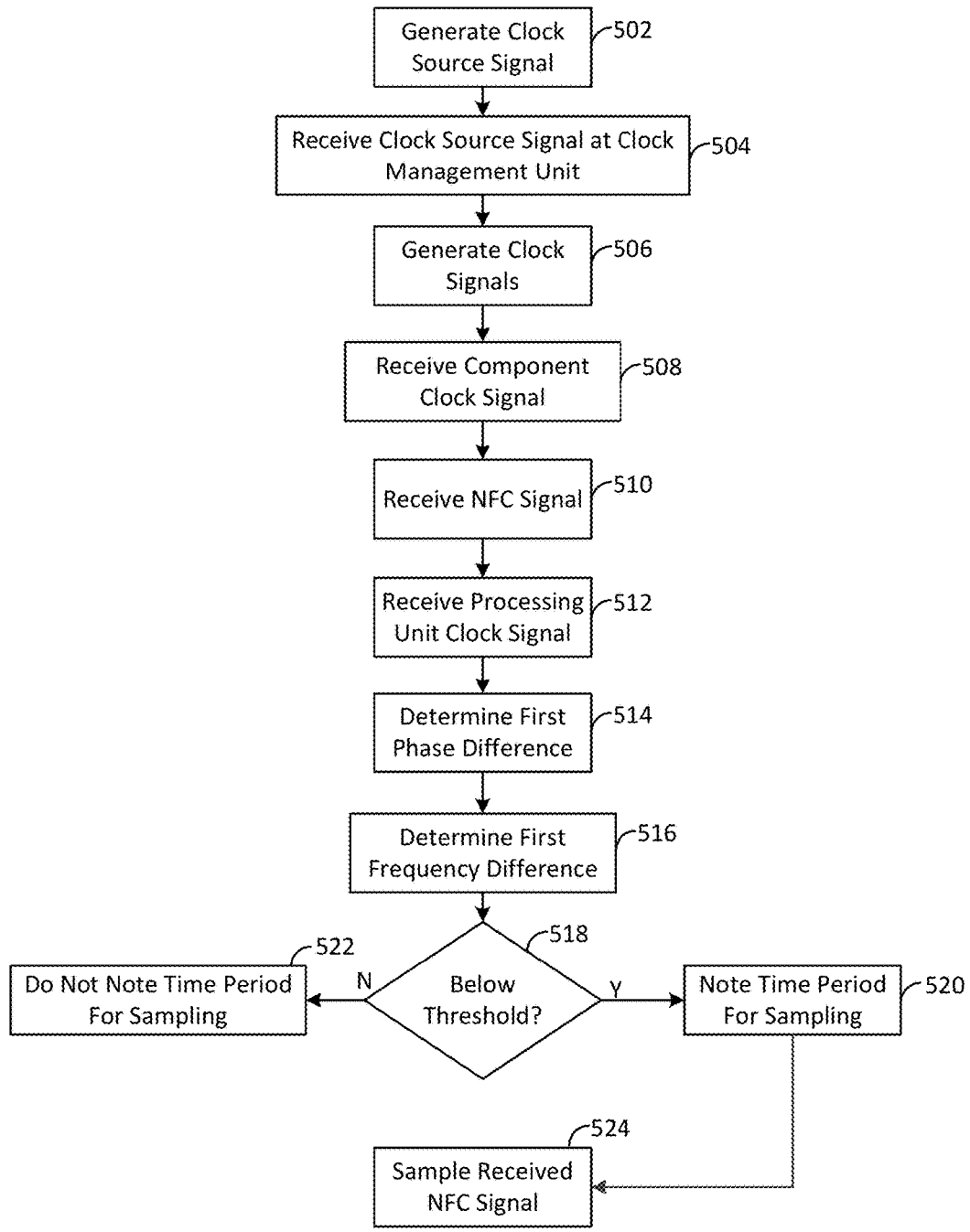
FIG. 5 depicts a non-limiting flow diagram illustrating exemplary steps of a noise management method optimizing communications of NFC signals at a point-of-sale system in accordance with some embodiments of the present disclosure.

FIG. 5 depicts a non-limiting flow diagram illustrating exemplary steps of a noise management method for optimizing communications of NFC signal at a point-of-sale system in accordance with some embodiments of the present disclosure. In an embodiment, the steps of FIG. 5 may be directed to and performed by a merchant terminal 110 or customer terminal 112 for optimizing receipt of a RF signal by sampling the signal at times when RF noise is below a threshold value. For simplicity, the term "payment terminal" may refer to either or a combination of the merchant terminal 110 or customer terminal 112. In addition, payment terminal components referenced herein may refer to corresponding components of either the merchant terminal 110 or customer terminal 112 or various suitable combinations thereof. Further, the operations below are described in the context of communication using NFC signals, but it will be understood that communication of RF communication signals according to other protocols are possible. It will be further understood that in some embodiments (not depicted in FIG. 5), identification of times when the RF signal may be sampled and noise is below a threshold value may be performed in other manners, as described herein.

At step 502, a clock source signal may be generated. The clock source signal may be generated by a clock source of the payment terminal, which may comprise hardware, software, or various combinations thereof. In some embodiments, the payment terminal may comprise one or more clock sources. The clock source signal generated at step 502 may provide a clock signal for performing processing operations to one or more components of the payment terminal. Note that the clock source signal may have a desired phase, frequency, duty cycle, or other characteristics for achieving the functionality described herein. Note also that the clock source signal generated by the clock source may be provided to various numbers of processing units of the payment terminal in other embodiments. After the clock source of the payment terminal has generated the clock source signal processing may continue to step 504.

At step 504 the clock source signal may be received at a clock management unit (e.g., clock management units 222 or 311) of the payment terminal, such as when provided from the clock source. In some embodiments, the payment terminal include various types of hardware, software, or various combinations thereof for controlling and managing clock signals provided to one or more of the various components of the payment terminal. In some embodiments, the clock management unit may be implemented in hardware and may be in communication with one or more processors, (e.g., processing unit 208, processing unit 312, processing unit 316, etc.), power sources, displays, or other components. The clock management unit may be configured to generate and provide a plurality clock signals based on receipt of the clock source signal. After the clock management unit receives the clock source signal, processing may proceed to step 506

At step 506, a plurality of clock signals may be generated at the clock management unit of the payment terminal. In some embodiments, the plurality of clock signals generated by the clock management unit may include various types of clock signals provided to various components of the payment terminal. For example, the plurality of clock signals may include a switching regulator clock signal, display clock signals, an NFC clock signal, and a processing unit clock signal. In addition, each of the plurality of clock signals may comprise various characteristics as desired. For example, the switching regulator clock signal may have the first phase and first frequency, the NFC clock signal may have a second phase and second frequency, the processing unit clock signal may have a third phase and third frequency and a display may have a fourth phase and a fourth frequency. In some embodiments, each of the plurality of clock signals may have different phases, frequencies, amplitudes, and/or duty cycles. After the clock management unit of the payment terminal has generated the plurality of clock signals, processing may continue to step 508.

As step 508 a component clock signal such as the switching regulator clock signal may be received, such as by one or more switching regulators of the payment terminal. In some embodiments, the payment terminal may comprise one or more components that may be configured for performing the functionality of a switching regulator such as a buck, boost, or other-switching regulator type. Exemplary components of the payment terminal which may include or embody the functionality of a switching regulator may include a power management device (e.g., power management device 204, power management device 304, etc.). In this regard, the switching regulator clock signal may be configured to synchronize operation of the one or more switching regulators of the payment terminal based on the switching regulator clock signal or signals. In addition, the switching regulator clock signal may have a first phase and first frequency when provided to the one or more switching regulators, such that a one or more switching regulators operate at an operating frequency that is based upon the first phase in the first frequency of the switching regulator clock signal. In this regard, a frequency of RF noise emitted by the one or more switching regulators during operation may have a phase and frequency that corresponds to the operating frequency of the one or more switching regulators and harmonics thereof. Thus, the phase and frequency of RF noise emitted by the one or more switching regulators may correspond to first phase and first frequency at which the one or more switching regulators of the payment terminal operate. After the one or more switching regulators has received the switching regulator clock signal, processing may proceed to step 510.

At step 510 a receive circuit of the payment terminal may receive a received NFC signal. In some embodiments, the payment terminal may include various components for receiving wireless RF signals communicated according to various wireless communication techniques (e.g., NFC, Bluetooth, etc.). Each such wireless communication protocol may involve transmission of signals at a particular wireless communication signal frequency (e.g., carrier signal frequency, modulation frequency, etc.), such as across one or more wireless frequency channels. The components of the payment terminal configured to communicate the wireless communication signals may include various types of hardware and/or software for receiving such wireless communication signals from other sources (e.g., NFC devices, payment terminals, etc.). In this regard, the receive circuit of the payment terminal may receive an NFC signal which is based on the NFC carrier signal (e.g., 13.5 MHz). In some embodiments, wireless signals communicated and received at the payment terminal may include RF noise. In this regard, received NFC signal may include RF noise, which may mean to increase processing errors at payment terminal in some embodiments, other types of noise may be present in the received RF signal, and may be received by the receiver circuit of the payment terminal for processing. Thereafter, processing may proceed to step 512.

As the 512, the processing unit clock signal may be received by the processing unit. In some embodiments, the processing unit clock signal provided by the clock management unit of the payment terminal may be based on a signal that will enable sampling of the received NFC signal by the processing unit. As noted above, the processing unit clock signal may have a third phase in third frequency, which may be configured as desired to enable sampling of the received NFC signal. As an example, sampling rates for the received NFC signal may be based on characteristics of the processing unit (e.g., hardware processing limitations). After the processing unit has received the processing unit clock signal, processing may proceed to step 514.

At step 514, the processing unit may determine the first phase difference between the first phase of the switching regulator clock signal and second phase of the NFC clock signal and/or received noise and data signals based on these signals. In some embodiments, the processing unit (e.g., processing unit 208, a processing unit 312, or secure processing unit 316) may perform a comparison of the switching regulator clock signal with the NFC clock signal, such as by executing the noise management instructions stored in memory. In some embodiments, the processing unit may be configured to determine the first phase difference by monitoring various types of information, such as an operating frequency of the one or more switching regulators, noise frequencies, and an operating frequency of components of the NFC receive circuit of the payment terminal (e.g., wireless interface 218, NFC interface 328, etc.). After the first phase difference has been determined, processing may proceed to step 516.

At step 516, a frequency difference between first frequency of the switching regulator clock signal and a second frequency of the NFC clock signal may be determined. In some embodiments, the processing unit may determine a first frequency difference by executing the noise management instructions, such as may be stored in memory at the payment terminal. To determine the first frequency difference, in some embodiments, the processing unit may compare the first frequency of the switching regulator clock signal with the second frequency of the NFC clock signal. In some embodiments, operating frequencies of components of the payment terminal that receive the switching regulator clock signal and NFC clock signal may be compared and an assumption regarding the second frequency difference may be performed in other embodiments. After the first frequency difference has been determined, processing may proceed to step 518.

At step 518, a plurality of time periods may be identified at which the noise is below a threshold. In some embodiments, the processing unit, such as when executing noise management instructions, may be configured to compare a value associated with a level of RF noise with a threshold value indicative of a threshold amount of RF noise. In some embodiments, the threshold may be determined based on the first phase difference and the first frequency difference determined at steps 514 and 516 above. In some embodiments, the processing unit may compare RF noise levels (e.g., identified by executing noise management instructions stored in memory). If a value of the RF noise falls below the threshold, processing may proceed to step 520, where the processing unit may identify a time period corresponding to the determination and identify the time period as a potential time for performing sampling of the received NFC signal. The processing unit may repeat such comparison and determination for a desired number of time periods, until a desired (e.g., minimum) number of time periods have been identified (e.g., such as an amount that exceeds a bit error rate threshold for processing received NFC signals at the payment terminal). If the RF noise exceeds the threshold, at step 522, the processing unit may note a corresponding time but will not identify the time period as one of the plurality of time periods for which sampling of the received NFC signal may be possible. For such time periods for which an RF noise level is not less than the threshold, the processing unit may determine that sampling is not appropriate or that RF noise levels may result in an amount of bit errors that exceeds a desired amount. After the plurality of possible time periods at which RF noise does not exceed a threshold has been identified, processing may proceed to step 524.

At step 524, the received NFC signal may be sampled at the time periods identified for which the RF noise level is below the threshold and which also corresponds to at least one of the plurality of possible sampling times for the received NFC signal. Accordingly, the processing unit may determine which time periods match one or more of the plurality of possible sampling times previously determined. In this regard, the processing unit, by executing the noise management instructions, may determine that sampling of the received NFC signal is possible for at least one of the plurality of time periods based on the possible sampling times for the received NFC signal identified step 512. In this regard, the processing unit may sample the received NFC signal at time periods when RF noise levels fall below a desired threshold, thereby improving processing of the received NFC signal and reducing errors. In some embodiments, the phase and/or frequency of a clock source signal provided to the processing unit may be modified to correspond to particular sampling times.

Figure 6:
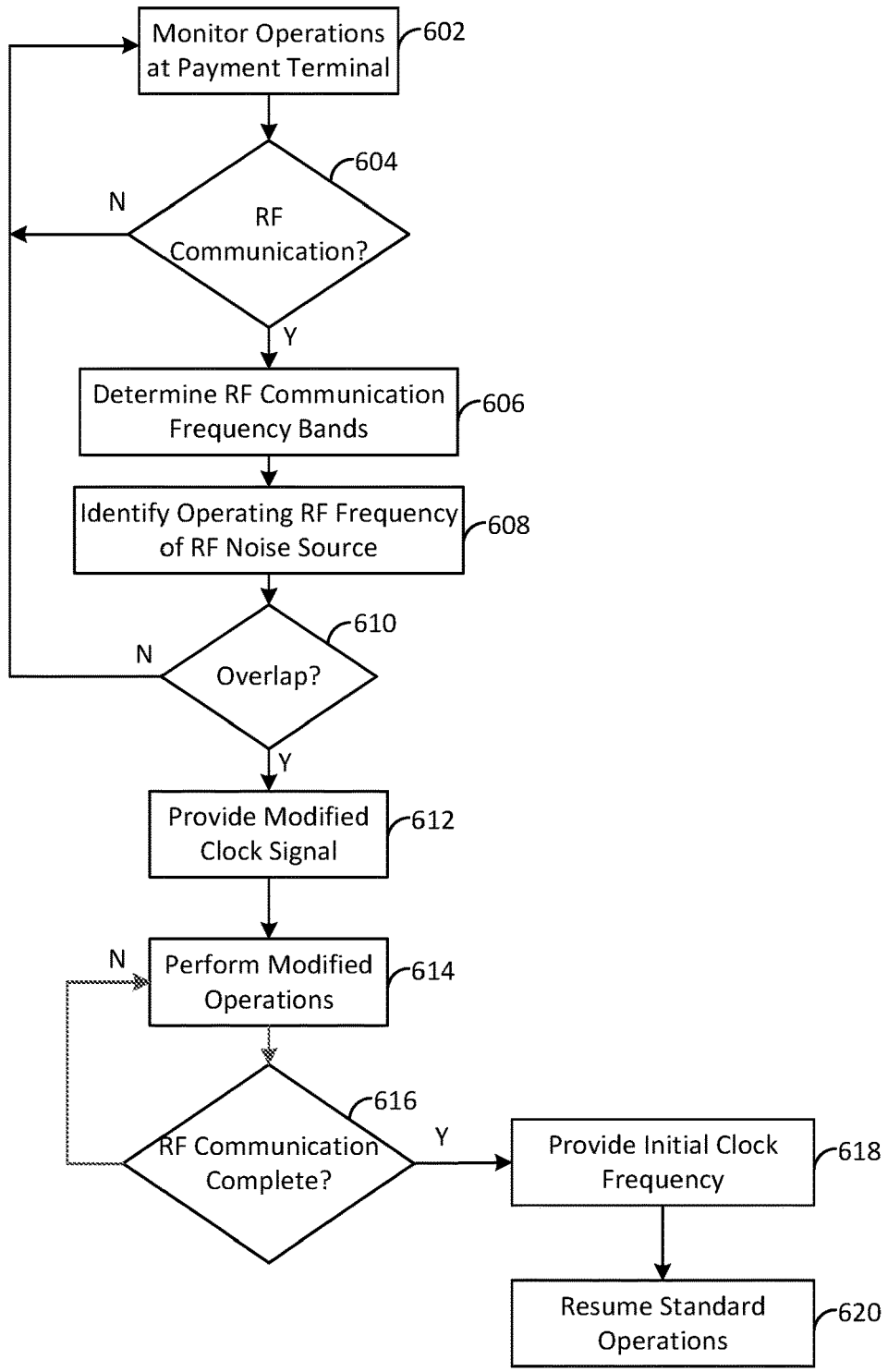
FIG. 6 depicts a non-limiting flow diagram illustrating exemplary steps of a noise management method for optimizing communications of NFC signals at a point-of-sale system in accordance with some embodiments of the present disclosure.

FIG. 6 depicts a non-limiting flow diagram illustrating exemplary steps of a noise management method for optimizing communications of NFC signals at a point-of-sale system in accordance with some embodiments of the present disclosure. As noted above with regard to FIG. 5, in an embodiment, the steps of FIG. 6 may be directed to and performed by a merchant terminal 110 or customer terminal 112 for coordinating operations of components of the payment terminal that may produce RF noise while a RF communication source of the payment terminal is communicating wireless RF signals. For simplicity, the term "payment terminal" may refer to either or a combination of the merchant terminal 110 or customer terminal 112. In addition, payment terminal components referenced herein may refer to corresponding components of either the merchant terminal 110 or customer terminal 112 or various suitable combinations thereof. Further, the operations below are described in the context of communication using RF communications, but it will be understood that communication of RF communication signals according to other protocols are possible. It will be further understood that in some embodiments (not depicted in FIG. 6), identification of RF noise sources and RF noise frequencies may be performed in other manners, as described herein.

At step 602 operations the payment terminal may be monitored, such as by a processing unit of the payment terminal. Operations of the wireless communication interfaces of the payment terminal (e.g., wireless communication interface 218 or NFC interface 328) may be monitored to determine when wireless RF communications occurs at the payment terminal. In some embodiments, the processing unit (e.g., processing unit 208, 314, or 316) may perform such monitoring by monitoring one or more clock signals provided to components of the payment terminal. In particular, the processing unit may monitor a clock signal provided to wireless communication components of the payment terminal, such as may be used to transmit or receive wireless RF signals. In this regard, the processing unit to determine times when wireless communications are occurring at the payment terminal (e.g., by executing noise management instructions stored in memory at the payment terminal).

At step 604, the processing unit to determine whether wireless RF communications are occurring at the payment terminal. The processing unit may do so by monitoring the operating frequency of RF communication source (e.g. wireless communication interface 218, NFC interface 328, etc.). If wireless RF communication is not currently occurring at the payment terminal, processing may return to step 602 where operations of the payment terminal may continue to be monitored until RF communication occurs. If wireless communication is occurring, then the processing may proceed to step 606.

At step 606, the processing unit may determine that wireless communication is occurring at the payment terminal, such as when a clock signal provided to one or more components of the payment terminal comprising a RF communication source has a frequency that corresponds to one or more wireless RF communication frequencies, or when a power provided or consumed by a transponder indicates that communications are occurring. For example, the processing unit may determine that the frequency of a clock signal provided to the RF communication source is within an RF communication frequency. After the processing unit has determined that the RF communication source of the payment terminal is communicating wirelessly, processing may then continue to step 608.

At step 608, the processing unit may identify an operating frequency of an RF noise source at the payment terminal. In some embodiments, the RF noise source may include one or more components of the payment terminal, such as one or more processing units (e.g., processing unit 208, main processing unit 314, or secured processing unit 316), communication interfaces (wireless interface 218, NFC interface 328, user interfaces 210, 310, and 318, etc.), user interfaces, or power sources. In some embodiments, a frequency of RF noise emitted by the RF noise source within payment terminal may correspond to an operating frequency of the component that is the source of RF noise or harmonics thereof. In this regard, the operating frequency of the RF noise source may be based on or correspond to a clock signal frequency that is provided to the RF noise source. The clock signal provided to an RF noise source identified by the processing unit may have an initial clock signal frequency at which the RF noise source may perform standard operations. The RF noise source may thus perform a set of standard operations when the initial clock signal frequency is provided to the RF noise source. Note that the standard set of operations may include various types of suitable operations, and can vary based on the type of component of the payment terminal that is the source of the RF noise. For example, in some embodiments, when a user interface of the payment terminal (e.g., user interfaces 210, 310, or 318) is implemented as a touchscreen, the touchscreen may perform operations at an initial clock frequency, such as displaying content to a user and receiving touch inputs, or various other types of operations that may be standard operations of the touchscreen interface. In some embodiments, the processing unit of the payment terminal may be configured to provide the initial clock frequency by default based on hardware, software, or various combinations thereof, and thus the touchscreen may perform a standard set of operations under normal circumstances. It is to be understood that the standard set of operations performed by the component that is the RF noise source may vary based on the type of component. After the processing unit has identified an operating frequency of the art of noise source, processing may proceed to step 610.

At step 610, an operating frequency of the RF noise source may be compared with one or more RF communication frequencies within which the RF communication source of the payment terminal is performing wireless RF communications. If the operating frequency of the one or more RF noise sources indicates that none of the one or more noise frequency frequencies overlaps with at least a portion of the one or more RF communication frequencies, processing may return to step 602 and the processing unit may continue to monitor the operation of components of the payment terminal for noise. However, if the processing unit determines that the one or more RF noise frequencies overlaps with at least a portion of the one or more RF communication frequencies that the payment terminal is using to communicate wirelessly, processing may proceed to step 612.

At step 612, the processing unit may identify a modified clock signal frequency that the processing unit may provide to the one or more RF noise sources in order to modify the operating frequency of the RF noise source, and thereby modify the RF noise frequencies so that the RF noise frequencies do not overlap with the RF communication frequencies. For example, if an operating frequency of an RF noise source causes the RF noise source to emit RF noise that overlaps a portion of the NFC frequencies (e.g., at 13.56 MHz modulated at 800 kHz), the processing unit may select an operating frequency for the RF noise source that will modify the frequencies of the RF noise emitted by the RF noise source. In this regard, a modified clock signal that corresponds to a modified operating frequency of the RF noise source may be identified by the processing unit. The processing unit may identify a modified clock signal for each of the one or more RF noise sources for which it has determined that RF noise frequencies overlap with any portion of the RF communication frequencies in use by the payment terminal. In this regard, the processing unit may provide a modified clock signal at a modified frequency to the one or more RF noise sources based on such determination. After a modified clock signal frequency has been provided to the one or more RF noise resources, and the one or more RF noise sources has received the modified clock frequency, processing may proceed to step 614.

At step 614, the one or more RF noise sources may perform reduced or modified operations based on receipt of the modified clock frequency from the processing unit (or in some embodiments, instead of receiving a modified clock frequency). As an example, when an RF noise source is operating according to an initial clock frequency, the RF noise resource may be configured to perform standard operations. In some embodiments, the RF noise source may perform a modified or reduced set of operations, such as by reducing power, performing only a limited subset of functions, or other similar steps that reduce processing or operational demands for the noise source. In some embodiments, the processing unit may take additional actions when the RF noise sources are operating at the modified operating frequency. For example, the processing unit may provide a particular output to a touchscreen of the payment terminal that cancels noise (e.g., by interposing known noise signals on the user interface 210, 310, or 318). After the RF noise source has begun performing reduced operations, processing may proceed to step 616

At step 616 the processing unit may determine whether the payment terminal has completed RF communication such that the RF communication source is no longer communicating. The processing unit may determine that the RF communication sources is no longer communicating based on various information, such as a clock signal provided to the RF communication source, the operating frequency of modifications was, power consumption of wireless interfaces, data received from the RF communication sources, etc. If the RF communication source is still communicating, the processing unit may continue to provide the modified clock frequency to the RF noise source and/or perform the reduced or modified operations such that the RF noise source continues to output a reduced amount of noise. However, if the processing unit determines that the RF communication source is no longer communicating wirelessly, processing may continue to step 618, where the processing unit may cease providing the modified clock frequency to the RF noise source, may provide the initial clock frequency. Thereafter, process processing may continue to step 620, where the noise source may resume the standard set of operations.

Figure 7:
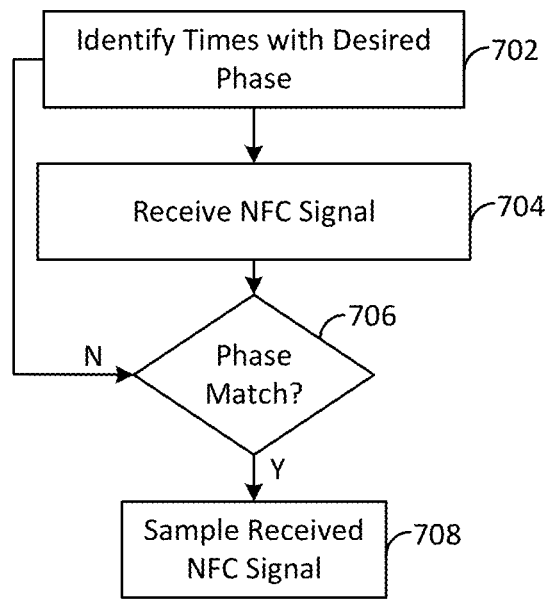
FIG. 7 depicts a non-limiting flow diagram illustrating exemplary steps of a noise management method for optimizing communications of NFC signals at a point-of-sale system in accordance with some embodiments of the present disclosure.

FIG. 7 depicts a non-limiting flow diagram illustrating exemplary steps of an alternative noise management method for optimizing communications of NFC signals at a point-of-sale system in accordance with some embodiments of the present disclosure. The steps of FIG. 7 may be carried out in addition to or in place of the steps described herein for determining a time for sampling a received NFC signal at a payment terminal, for example with regard to FIG. 5. For simplicity, the term "payment terminal" may refer to either or a combination of the merchant terminal 110 or customer terminal 112. In addition, payment terminal components referenced herein may refer to corresponding components of either the merchant terminal 110 or customer terminal 112 or various suitable combinations thereof. Further, the operations below are described in the context of communication using NFC signals, but it will be understood that communication of RF communication signals according to other protocols are possible.

With regard to FIG. 7, it will be assumed that a clock management unit receives a clock source signal and is providing a plurality of clock signals to components of the payment terminal, as described with regard to FIG. 5. In an embodiment, the steps of FIG. 7 may be directed to and performed by a payment terminal for optimizing receipt of a RF signal by sampling the signal at times when a phase of the received NFC signal matches a desired phase of the processing unit clock signal. It will be further understood that in some embodiments (not depicted in FIG. 7), identification of phases at which the RF signal may be sampled in other manners, as described herein.

At step 702 the processing unit may identify a phase at which a received RF signal may be sampled. Although times at which a received RF sample may be identified based on various information (e.g., processing unit clock frequency as in FIG. 5), in some embodiments, the processing unit may identify a plurality of possible sampling times based on correlation of a phase of the processing unit clock signal. In this regard, a plurality of possible sampling times may be identified based on the phase of the processing unit clock signal. After a phase of the processing unit clock signal at which sampling may be possible has been identified, processing may proceed to step 704.

At step 704 a receive circuit of the payment terminal may receive an NFC signal, such as from a wireless transaction device. In some embodiments, the received NFC signal may have a phase, frequency, amplitude and duty cycle. The processing unit of the payment terminal may be operable to note a phase of the received NFC signal as the payment terminal's receive circuit receives the NFC signal. After the NFC signal has been received, processing may proceed to step 706.

At step 706, the processing unit may determine whether a phase of the received NFC signal matches a phase of a processing unit clock signal. In some embodiments, whether the phases of the NFC signal and processing unit clock signal match may be determined based on a difference between the phases, or based on a comparison of whether a phase of the received NFC signal is within a threshold difference of the phase of the processing unit clock signal.

If the phase difference exceeds the threshold difference, the processing unit may determine that the phases do not match, and processing may return to step 702. If the phase difference is below a threshold difference, the processing unit may determine that the phases match, and processing may proceed to step 708. At step 708, the processing unit may sample the received NFC signal for processing by the processing unit of the payment terminal.

Figure 8A:
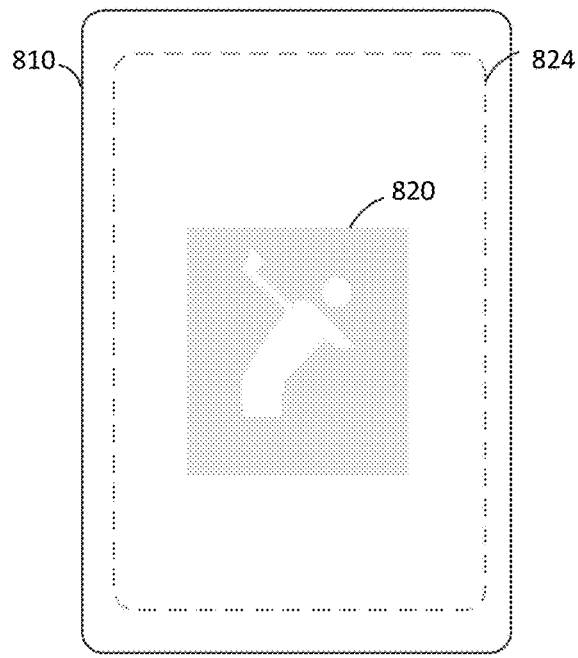
FIG. 8A depicts a front perspective view of a screen of a customer terminal showing a graphical output on the screen in accordance with some embodiments of the present disclosure.
Figure 8B:
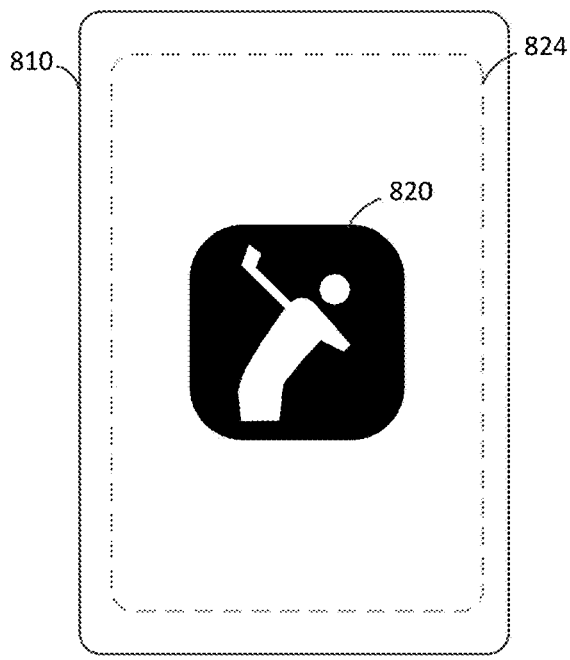
FIG. 8B depicts a front perspective view of a customer terminal showing a graphical output on the screen in accordance with some embodiments of the present disclosure.

FIGS. 8A and 8B depict a front perspective view of a user interface of a payment terminal in accordance with some embodiments of the present disclosure. The user interface of FIGS. 8A and 8B is depicted as a touchscreen displaying a graphical output. In the embodiment of FIGS. 8A and 8B, an exemplary user interface is depicted, and it is to be understood that although the user interface of FIGS. 8A and 8B may have certain characteristics and configuration, the user interface is representative of operation at of either a merchant terminal 110 or payment terminal 112. The exemplary payment terminal of FIGS. 8A and 8B comprises user interface 800 and capable of displaying an output 820. The output 820 displayed in FIGS. 8A and 8B is depicted as a graphical output such as may be displayed to a user of the payment terminal, but it will be understood that the output 820 is an exemplary and can be altered or comprise various types of output which the interface 810 is capable of providing in other embodiments. In addition, it will be understood that even though the payment terminals of FIGS. 8A and 8B may be depicted as having particular components and implemented in a particular configuration and arrangement, other combinations arrangement of components are possible.

In addition, the payment terminal of FIGS. 8A and 8B is configured for exchanging wireless messages with a user for completing payment transactions wirelessly. In some embodiments, the payment terminal also may include components for accomplishing wireless RF communication such as antenna 824, as well as at least one processing unit (not specifically shown in FIGS. 8A and 8B), memory for storing instructions (not specifically shown in FIGS. 8A and 8B), a power supply (not specifically shown in FIGS. 8A and 8B), or any or all of the components which may be included with the various embodiments of a payment terminal as described herein.

As shown in FIG. 8A, interface 810 of the payment terminal is implemented as a touchscreen interface. The user interface 810 is depicted as being adjacent (e.g. positioned close in proximity within the payment terminal) to a wireless antenna 824 that is capable of transmitting and receiving wireless RF communication from various sources (e.g., NFC, Bluetooth, etc.). In the embodiment of FIG. 8A, the interface 810 is depicted as performing operations with a modified user interface (e.g., with lower power usage, modified frequency, and/or offsetting noise characteristics). As noted herein, the components of the payment terminal, such as interface 810 may emit RF noise. In this regard RF noise by interface 810 may cause undesirable errors in processing of wireless indication signals. A processing unit of the payment terminal may execute noise management instructions in order to optimize operations of the payment terminal and manage noise emitted by components of the payment terminal.

In some embodiments of FIG. 8A, a processing unit of the payment terminal may execute instructions to determine wireless communication frequencies that are in use by the payment terminal. In an exemplary embodiment, the processing unit may determine the RF communication frequency bands based on a RF communication protocol in use by the payment terminal, such as by determining a clock signal frequency provided to or operating frequency for the payment terminal's RF communication source. Other techniques and information may be provided to and used by the processing unit to determine that the payment terminal is communicating wirelessly and identify one or more RF communication frequency bands in other embodiments.

In some embodiments, the processing unit of the payment terminal of FIGS. 8A and 8B likewise may identify one or more RF noise frequencies bands associated with one or more components of the payment terminal, such as based on a clock frequency provided to one or more components such as the user interface. If an operating frequency corresponds to a frequency of RF noise emitted by the component that will overlap any portion of the one or more RF communication frequencies, the processing unit may identify a modified or reduced clock frequency to provide to the component that is the source of the RF noise. In the embodiment of FIGS. 8A and 8B, the user interface 210 (touchscreen) emits RF noise at a frequency that overlaps a portion of the one or more RF communication frequencies. In this regard, the processing unit may note the initial clock signal provided to the user interface 210 and identify a modified clock signal to provide that will modify a frequency of RF noise the user interface is emitting. That is, a modified operating frequency may be provided that causes an RF noise source to emit RF noise at one or more frequencies that does not overlap any portion of the one or more RF communication frequencies of the payment term.

In an exemplary embodiment, output 820 is depicted as operating at a modified clock frequency, as demonstrated by display of a graphic output 820 that has an increased transparency. In some embodiments the noise emitted by the display may be modified in other manners, such as by modifying a power supplied to or consumed by the user interface (e.g., by changing a displayed image to have less contrast, brightness, etc.) or introducing image patterns that result in cancellation or reduced noise. Although such modifications to the graphics graphic 820 display the interface may or may not be perceptible to a user viewing the interface 810, by performing modified operations of the interface, according to the modified operating frequency, RF noise generated during operation of the user interface 810 may be reduced, or in some embodiments, modified such that the one or more RF noise frequencies do not overlap with the one or more RF frequencies at which the terminal is communicating.

The processing unit may monitor wireless communication at the payment terminal to determine when the payment terminal is no longer communicating wirelessly. When the processing unit determines that the payment terminal is no longer communicating wirelessly at the RF communication frequency, the processing unit return the user interface 810 to normal operations. In response, as depicted in FIG. 8B, when the user interface 810 returns to normal operation, the user interface 810 may resume standard operations, such that content displayed by the user interface 810 is provided at a standard operating frequency. For example, content 20 may be displayed at a higher contrast, brightness, with more power to display, or at a more suitable frequency for the particular user interface 810.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for coordinating operations between a radio frequency (RF) communications source and a RF noise source of a transaction processing device, the method comprising:
   executing instructions, by a processing unit of the transaction processing device, to determine, in a case that the RF communications component is communicating at a first RF communications frequency, that a wireless communication is in progress with a second device, wherein the RF communications component comprises a near field communication (NFC) transponder or a Bluetooth transponder;
   identifying, by the processing unit, an operating frequency of the RF noise source, wherein the RF noise source comprises one or more of the processing unit or a touch-screen display, wherein the operating frequency of the RF noise source is based on a clock signal, wherein the clock signal has an initial clock frequency, and wherein the RF noise source performs a set of standard operations at the operating frequency;
   identifying, by the processing unit, one or more noise frequencies of the RF noise source based on the operating frequency of the RF noise source;
   executing instructions, by the processing unit, to determine that the one or more of the noise frequencies interferes with the first RF communications frequency;
   modifying, by the processing unit, based on the determination that the one or more of the noise frequencies interferes with the first RF communications frequency, the clock signal from the initial clock frequency to a modified clock frequency, wherein a modified operating frequency is based on the modified clock frequency, wherein one or more modified noise frequencies are based on the modified operating frequency, and wherein none of the one or more modified noise frequencies interfere with the first RF communications frequency;
   performing, by the RF noise source, a modified set of operations at the modified operating frequency;
   executing instructions, by the processing unit, to determine that the wireless communication has been completed, in a case that the RF communications component is no longer communicating at the first RF communications frequency;
   restoring, by the processing unit, the clock signal from the modified clock frequency to the initial clock frequency based on the determination that the wireless communication has been completed; and
   performing, by the RF noise source, the standard operations at the operating frequency based on the modification of the clock signal to the initial clock frequency.

2. The method of claim 1, wherein the RF noise source comprises a touch-screen, and wherein the reduced set of operations comprises:
   generating, by the processing unit, a modified output for display at the touch-screen;
   providing, by the processing unit, the modified output to the touch-screen; and
   displaying, at the touch-screen, the modified output, wherein the modified output emits less RF noise than a standard output of the touch screen.

3. The method of claim 2, wherein the modified output comprises a noise reducing pattern.

4. The method of claim 1, wherein the determining that the one or more of the noise frequencies interferes with the first RF communications frequency comprises:
   comparing, by the processing unit, the one or more of the noise frequencies with one or more ranges of frequencies used in wireless communication protocols.

5. The method of claim 1, wherein the determining that the one or more of the noise frequencies interferes with the first RF communications frequency comprises:
   comparing, by the processing unit, the one or more of the noise frequencies with a Bluetooth channel map for the Bluetooth transponder.

6. The method of claim 1, wherein the determining that the one or more of the noise frequencies interferes with the first RF communications frequency comprises:
   comparing, by the processing unit, the one or more of the noise frequencies with one or more bit rate error values for the NFC transponder.

7. A method for reducing radio frequency (RF) noise of a wireless communication device, the method comprising:
   executing instructions, by a processing unit of the wireless communication device, to determine, in a case that a RF communications component is communicating at a first RF communications frequency, that a wireless communication is in progress with a second device, the wireless communication being a short-range communication;
   executing instructions, by the processing unit, to determine that one or more noise frequencies interfere with the first RF communications frequency;
   modifying, by the processing unit, the operation of a RF noise source from a standard frequency to a modified frequency, based on the determination of the interfering frequencies;
   executing instructions, by the processing unit, after the modification of the frequency of the RF noise source, to determine that the wireless communication has been completed, in a case that the RF communications component is no longer communicating at the first RF communications frequency; and
   restoring the operation of the RF noise source from the modified frequency to the standard frequency, based on the determination that the wireless communication has been completed.

8. The method of claim 7, wherein the RF communications component comprises a near field communication (NFC) transponder or a Bluetooth transponder.

9. The method of claim 7, wherein the modification comprises providing a modified clock source frequency to the RF noise source,
   wherein the one or more noise frequencies are modified based on the modified clock source frequencies,
   wherein the modified one or more noise frequencies do not interfere with the first RF communications frequency, and wherein the restoring comprises providing a standard clock source frequency to the RF noise source.

10. The method of claim 7, wherein the modification comprises a reduced set of operations for the RF noise source, and
wherein the restoring comprises performing a standard set of operations.

11. The method of claim 10, wherein the RF noise source comprises a touch-screen, and
wherein the reduced set of operations comprises:
generating, by the processing unit, a modified output for display at the touch-screen;
providing, by the processing unit, the modified output to the touch-screen; and
displaying, at the touch-screen, the modified output, wherein the modified output emits less RF noise than a standard output of the touch screen.

12. The method of claim 11, wherein the modified output comprises a noise-reducing pattern.

13. The method of claim 7, wherein the determining that the one or more of the noise frequencies interferes with the first RF communications frequency comprises:
comparing, by the processing unit, the one or more of the noise frequencies with one or more ranges of frequencies used in wireless communication protocols.

14. The method of claim 7, wherein the RF communications component comprises a Bluetooth transponder, and
wherein the determining that the one or more of the noise frequencies interferes with the first RF communications frequency comprises comparing, by the processing unit, the one or more of the noise frequencies with a Bluetooth channel map for the Bluetooth transponder.

15. The method of claim 7, wherein the RF communications component comprises a near field communication (NFC) transponder, and
wherein the determining that the one or more of the noise frequencies interferes with the first RF communications frequency comprises comparing, by the processing unit, the one or more of the noise frequencies with one or more bit rate error values for the NFC transponder.

16. A wireless communication device for reducing radio frequency (RF) noise, the wireless communication device comprising:
a RF communications component;
a RF noise source;
a memory having instructions stored therein; and
a processing unit coupled to the RF communications component, RF noise source, and memory and configured to execute instructions stored therein to perform operations comprising:
(a) determining, in a case that the RF communications component is communicating at a first RF communications frequency, that a wireless communication is in progress with a second device, the wireless communication being a short-range communication;
(b) determining that one or more noise frequencies interfere with the first RF communications frequency;
(c) modifying the operation of the RF noise source from a standard frequency to a modified frequency, based on the determination of the interfering frequencies;
(d) determining that the wireless communication has been completed, in a case that the RF communications component is no longer communicating at the first RF communications frequency; and
(e) restoring the operation of the RF noise source from the modified frequency to the standard frequency, based on the determination that the wireless communication has been completed.

17. The device of claim 16, wherein the RF communications component comprises a near field communication (NFC) transponder or a Bluetooth transponder.

18. The device of claim 16, wherein the modifying comprises providing a modified clock source frequency to the RF noise source,
wherein the one or more noise frequencies are modified based on the modified clock source frequencies,
wherein the modified one or more noise frequencies do not interfere with the first RF communications frequency, and
wherein the restoring comprises providing a standard clock source frequency to the RF noise source.

19. The device of claim 16, wherein the modifying comprises performing a reduced set of operations for the RF noise source, and wherein the restoring comprises performing a standard set of operations.

20. The device of claim 19, wherein the RF noise source comprises a touch-screen, and wherein the reduced set of operations comprises:
generating a modified output for display at the touch-screen; and
providing the modified output to the touch-screen,
wherein the touch-screen displays the modified output, and wherein the modified output emits less RF noise than a standard output of the touch screen.

21. The device of claim 20, wherein the modified output comprises a noise-reducing pattern.

22. The device of claim 16, wherein the determining that the one or more of the noise frequencies interferes with the first RF communications frequency comprises:
comparing the one or more of the noise frequencies with one or more ranges of frequencies used in wireless communication protocols.

23. The device of claim 16, wherein the RF communications component comprises a Bluetooth transponder, and
wherein the determining that the one or more of the noise frequencies interferes with the first RF communications frequency comprises comparing the one or more of the noise frequencies with a Bluetooth channel map for the Bluetooth transponder.

24. The device of claim 16, wherein the RF communications component comprises a near field communication (NFC) transponder, and
wherein the determining that the one or more of the noise frequencies interferes with the first RF communications frequency comprises comparing the one or more of the noise frequencies with one or more bit rate error values for the NFC transponder.

25. A non-transitory computer-readable storage medium comprising instructions stored therein, which, when executed by one or more processors, cause the one or more processors to perform operations comprising:
determining, in a case that a RF communications component is communicating at a first RF communications frequency, that a wireless communication is in progress with another device, the wireless communication being a short-range communication;
determining that one or more noise frequencies interfere with the first RF communications frequency;
modifying the operation of the RF noise source from a standard frequency to a modified frequency, based on the determination of the interfering frequencies;

determining that the wireless communication has been completed, in a case that the RF communications component is no longer communicating at the first RF communications frequency; and restoring the operation of the RF noise source from the modified frequency to the standard frequency, based on the determination that the wireless communication has been completed.

26. The non-transitory computer-readable storage medium of claim 25, wherein the RF communications component comprises a near field communication (NFC) transponder or a Bluetooth transponder.

27. The non-transitory computer-readable storage medium of claim 25, wherein the modifying comprises providing a modified clock source frequency to the RF noise source, wherein the one or more noise frequencies are modified based on the modified clock source frequencies, wherein the modified one or more noise frequencies do not interfere with the first RF communications frequency, and wherein the restoring comprises providing a standard clock source frequency to the RF noise source.

28. The non-transitory computer-readable storage medium of claim 25, wherein the modifying comprises a reduced set of operations for the RF noise source, and wherein the restoring comprises performing a standard set of operations.

29. The non-transitory computer-readable storage medium of claim 28, wherein the RF noise source comprises a touch-screen, and wherein the reduced set of operations comprises:

generating a modified output for display at the touch-screen; and providing the modified output to the touch-screen, wherein the touch-screen displays the modified output, and wherein the modified output emits less RF noise than a standard output of the touch screen.

30. The non-transitory computer-readable storage medium of claim 29, wherein the modified output comprises a noise-reducing pattern.

\* \* \* \* \*